(12) United States Patent
Lee et al.

(10) Patent No.: US 12,489,850 B2
(45) Date of Patent: Dec. 2, 2025

(54) VIDEO CALL PROCESSING METHOD, DISPLAY DEVICE FOR PERFORMING SAME METHOD, MOBILE DEVICE FOR PERFORMING SAME, SERVER FOR PERFORMING SAME METHOD, AND COMPUTER-READABLE STORAGE MEDIUM IN WHICH PROGRAM FOR PERFORMING SAME METHOD IS STORED

(71) Applicant: SAMSUNG ELECTRONICS CO., LTD., Suwon-si (KR)

(72) Inventors: Jongin Lee, Suwon-si (KR); Sehyun Kim, Suwon-si (KR); Kilsoo Choi, Suwon-si (KR); Jiwon Park, Suwon-si (KR); Soyoung Ju, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 377 days.

(21) Appl. No.: 18/074,038

(22) Filed: Dec. 2, 2022

(65) Prior Publication Data

US 2023/0104866 A1  Apr. 6, 2023

Related U.S. Application Data

(63) Continuation of application No. PCT/KR2021/006787, filed on Jun. 1, 2021.

(30) Foreign Application Priority Data

Jun. 4, 2020 (KR) .................. 10-2020-0067866

(51) Int. Cl.
*H04M 3/54* (2006.01)
*G06F 3/14* (2006.01)
(Continued)

(52) U.S. Cl.
CPC ................ *H04M 3/54* (2013.01); *G06F 3/14* (2013.01); *H04L 63/04* (2013.01); *H04N 23/60* (2023.01)

(58) Field of Classification Search
CPC .................................. H04M 3/54; H04L 63/04
See application file for complete search history.

(56) References Cited

U.S. PATENT DOCUMENTS 6,545,697 B1  4/2003  Parker et al.
9,124,762 B2  9/2015  Cutler et al.
(Continued)

FOREIGN PATENT DOCUMENTS

JP  2008-270911 A  11/2008
KR  10-2008-0044379 A  5/2008
(Continued)

OTHER PUBLICATIONS

Search Report (PCT/ISA/210) issued Aug. 30, 2022 by the International Searching Authority for International Patent Application No. PCT/KR2021/006787.
(Continued)

*Primary Examiner* — Amal S Zenati
(74) *Attorney, Agent, or Firm* — Sughrue Mion, PLLC

(57) ABSTRACT

A video call processing method includes receiving a substitution request that a video call being performed by a mobile device be performed by the display device, generating, by the display device based on the substitution request, a notification signal corresponding to the substitution request, and transmitting, before a video call screen that includes an image of a counterpart of the video call is output by the display device, the notification signal to a counterpart device, which is a mobile device of the counterpart.

15 Claims, 26 Drawing Sheets

(51) Int. Cl.
  *H04L 9/40* (2022.01)
  *H04N 23/60* (2023.01)

(56) References Cited

U.S. PATENT DOCUMENTS

| | | | |
|---|---|---|---|
| 9,197,848 | B2 | 11/2015 | Felikai et al. |
| 10,327,030 | B2 | 6/2019 | Oh et al. |
| 10,715,762 | B2 | 7/2020 | Lee et al. |
| 10,771,737 | B2 | 9/2020 | Mercredi et al. |
| 2008/0254828 | A1 | 10/2008 | Kano et al. |
| 2013/0342637 | A1* | 12/2013 | Felkai ................ H04L 65/1094 348/E7.083 |
| 2016/0316414 | A1 | 10/2016 | Yeoum et al. |
| 2017/0126895 | A1* | 5/2017 | Tevonian ................ H04M 3/58 |
| 2017/0155831 | A1 | 6/2017 | Jang et al. |

FOREIGN PATENT DOCUMENTS

| | | | |
|---|---|---|---|
| KR | 10-2014-0051014 | A | 4/2014 |
| KR | 10-1392917 | B1 | 5/2014 |
| KR | 10-2015-0090424 | A | 8/2015 |
| KR | 10-2016-0126388 | A | 11/2016 |
| KR | 10-2017-0039629 | A | 4/2017 |
| KR | 10-2017-0064242 | A | 6/2017 |
| KR | 10-2017-0083360 | A | 7/2017 |
| KR | 10-1759935 | B1 | 7/2017 |
| KR | 10-2017-0091913 | A | 8/2017 |

OTHER PUBLICATIONS

Written Opinion (PCT/ISA/237) issued Aug. 30, 2022 by the International Searching Authority for International Patent Application No. PCT/KR2021/006787.
Communication dated Nov. 29, 2024 issued by the Korean Intellectual Property Office in Korean Patent Application No. 10-2020-0067866.
Communication dated Aug. 22, 2025, issued by the Korean Patent Office in Korean Application No. 10-2020-0067866.

* cited by examiner

VIDEO CALL PROCESSING METHOD, DISPLAY DEVICE FOR PERFORMING SAME METHOD, MOBILE DEVICE FOR PERFORMING SAME, SERVER FOR PERFORMING SAME METHOD, AND COMPUTER-READABLE STORAGE MEDIUM IN WHICH PROGRAM FOR PERFORMING SAME METHOD IS STORED

CROSS-REFERENCE TO RELATED APPLICATIONS

This application is a bypass continuation of PCT International Application No. PCT/KR2021/006787 filed on Jun. 1, 2021, which claims priority to Korean Patent Application No. 10-2020-0067866 filed on Jun. 4, 2020. The above applications are hereby incorporated by reference, in their entireties, into the present application.

BACKGROUND

1. Field

The present disclosure relates to a video call processing method, a display device for performing the method, a mobile device for performing the method, a server for performing the method, and a computer-readable storage medium in which a program for performing the method is stored.

2. Description of Related Art

With the development of wired/wireless communication networks, electronic devices capable of displaying a screen to output data that is visibly recognizable by a user may be connected to each other through a wired/wireless communication network.

The electronic devices may transmit and receive various types of data to and from each other through the wired/wireless communication network, and a user may remotely control or use one of the electronic devices through another electronic device.

For example, with the development of wired/wireless communication networks and communication technologies, the use of video call services between mobile devices has increased. In addition, mobile devices and other electronic devices may be connected to each other through a wired/wireless communication network. Examples of electronic devices capable of connecting to each other through a wired/wireless communication network may include portable computers such as notebook computers, netbooks or tablet personal computers (PCs), portable terminals such as smart phones or personal digital assistants (PDAs), and televisions (TVs).

By using electronic devices connected to each other, users may be provided with a desired service or function in a more convenient manner. For example, when two mobile devices remotely located from each other are performing a video call with each other, a user may connect a third electronic device to one of the two mobile devices to allow the video call to be performed on the third electronic device.

As described above, when a plurality of electronic devices are connected to each other and used, it may be necessary to provide a device and method for protecting the privacy of users of the plurality of electronic devices while increasing user satisfaction and convenience.

SUMMARY

Embodiments of the present disclosure provide a video call processing method for, when a plurality of electronic devices are connected to each other and used, protecting the privacy of users of the plurality of electronic devices, a display device for performing the method, a mobile device for performing the method, a server for performing the method, and a computer-readable storage medium in which a program for performing the method is stored.

In accordance with an aspect of the disclosure, a video call processing method performed by a display device, includes: receiving a substitution request that a video call being performed by a mobile device be performed by the display device; generating, by the display device based on the substitution request, a notification signal corresponding to the substitution request; and transmitting, before a video call screen that includes an image of a counterpart of the video call is output by the display device, the notification signal to a counterpart device, which is a mobile device of the counterpart.

The notification signal may include information about the display device and information for notifying of a substitution in the video call.

The method may further include performing, based on an offset period of time elapsing after the notification signal is transmitted, the video call by the display device.

The method may further include performing, based on a response for accepting the substitution request being received from the counterpart device, the video call by the display device.

The method may further include activating, based on the substitution request, a camera included in the display device and outputting a video call screen that includes a first image obtained by the camera.

The outputting of the video call screen may include outputting, based on a response corresponding to the notification signal being received from the counterpart device, the video call screen that includes the first image and a second image of the counterpart obtained by the counterpart device.

The outputting of the video call screen may include outputting, based on the response corresponding to the notification signal not being received from the counterpart device, the video call screen that includes the first image and an alternative image, which is not an image of the counterpart of the video call.

The method may further include activating, based on the substitution request, a camera included in the display device and obtaining a first image; and transmitting, to the counterpart device of the video call, first image data corresponding to the first image.

The transmitting to the counterpart device may include: outputting, by the display device, a preview screen that includes the first image; receiving a user input for permitting a video call screen that includes the first image to be output by the counterpart device; and based on the user input being received, transmitting, to the counterpart device, first image data corresponding to the first image.

The transmitting to the counterpart device may include: comparing the first image with an existing image obtained by the mobile device; and based on a result of the comparing, outputting, by the display device, a preview screen that includes the first image.

The outputting of the preview screen may include, based on determining that the first image includes an additional imaging area compared to the existing image, outputting, by the display device, a preview screen that includes the first image.

The outputting of the preview screen may include, based on determining that the first image includes an additional imaging area compared to the existing image, outputting, before transmitting the first image data from the display device to the counterpart device of the video call, a notification for notifying of the result of the comparing.

The method may further include activating, based on the substitution request, a camera included in the display device and obtaining a first image; based on a result of comparing the first image with the existing image obtained by the mobile device, identifying a region of the first image corresponding to the existing image; and controlling image data corresponding to the identified region to be transmitted to the counterpart device.

In accordance with an aspect of the disclosure, a display device includes: a display; a camera; a communication interface configured to communicate with a mobile device; and a processor configured to execute at least one instruction to: receive a substitution request that a video call being performed by the mobile device be performed by the display device; generate, based on the substitution request, a notification signal corresponding to the substitution request; and control the notification signal to be transmitted to a counterpart device of the video call before a video call screen that includes an image of a counterpart of the video call is output on the display.

In accordance with an aspect of the disclosure, a non-transitory computer-readable storage medium having recorded thereon a program including at least one instruction for performing a video call processing method, the video call processing method includes: receiving a substitution request that a video call being performed by a mobile device be performed by a display device; generating, by the display device based on the substitution request, a notification signal corresponding to the substitution request; and transmitting, before a video call screen that includes an image of a counterpart of the video call is output by the display device, the notification signal to a counterpart device of the video call.

In accordance with an aspect of the disclosure, a method, performed by a mobile device, of performing a video call includes: receiving, by the mobile device performing a video call with a counterpart device, a notification signal for notifying that the counterpart device is to be substituted with a display device; outputting information corresponding to the notification signal; in response to the information being output, determining whether an event indicating acceptance of device substitution in the video call occurs; and, based on a result of the determining, determining whether to transmit, to the display device, image data regarding a user of the mobile device and obtained by a camera of the mobile device.

In accordance with an aspect of the disclosure, a display device includes a display; a camera; a communication unit configured to communicate with external devices including a mobile device; and a processor configured to execute at least one instruction. The processor is configured to execute the at least one instruction to receive a substitution request that a video call being performed by the mobile device be performed by the display device, generate a notification signal corresponding to the substitution request in response to the substitution request, and control the notification signal to be transmitted to a counterpart device of the video call, before a video call screen including an image of a counterpart of the video call is output on the display.

In accordance with an aspect of the disclosure, a server for supporting a video call includes: a communication unit configured to communicate with at least one external device; and a processor configured to executes at least one instruction. The processor is configured to executes the at least one instruction to relay a video call between a first mobile device and a second mobile device, receive a substitution request that the video call being performed by the first mobile device be performed by a display device, receive a notification signal generated by the display device in response to the substitution request, and control the notification signal to be transmitted to the second mobile device, before a video call screen including an image of a user of the second mobile device is output by the display device.

By using a video call processing method, a display device for performing the method, a mobile device for performing the method, a server for performing the method, and a computer-readable storage medium in which a program for performing the method is stored, according to embodiments of the present disclosure, when a plurality of electronic devices are connected to each other and used, the privacy of users of the plurality of electronic devices may be protected.

In detail, by using the video call processing method, the display device for performing the method, the mobile device for performing the method, the server for performing the method, and the computer-readable storage medium in which the program for performing the method is stored, according to the embodiments of the present disclosure, when a display device is connected to and then substitutes for one of two mobile devices that are performing a video call with each other, information for protecting the privacy of a user of the other mobile device may be provided to the user of the other mobile device. Accordingly, the privacy of the user of the other mobile device may be protected.

DETAILED DESCRIPTION

Figure 1:
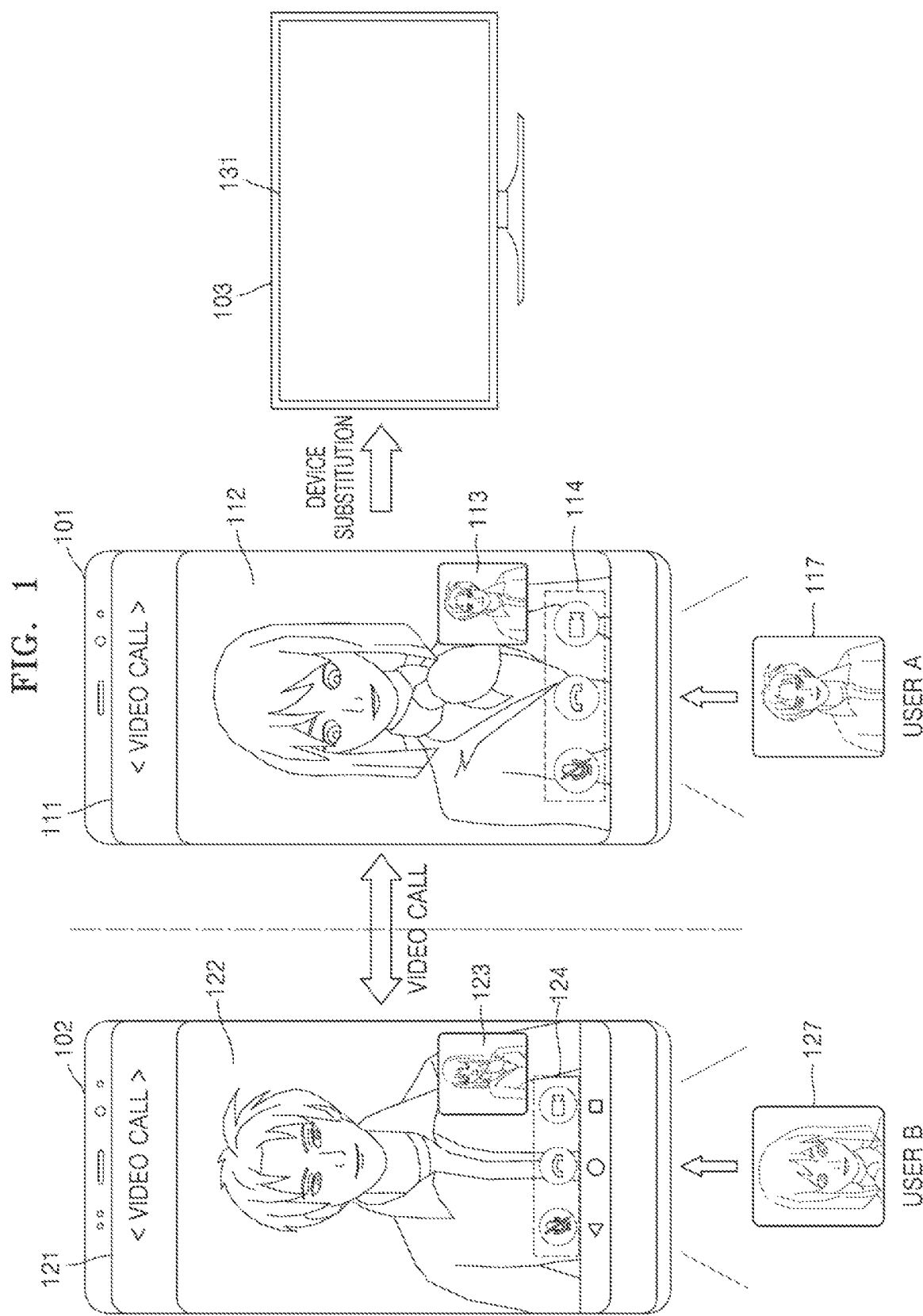
FIG. 1 is a diagram illustrating a display device that is connected, through a communication network, to one of two mobile devices that are performing a video call with each other.

Embodiments of the present disclosure will be described in detail with reference to the accompanying drawings for one of skill in the art to be able to implement the embodiments of the present disclosure without any difficulty. The present disclosure may, however, be embodied in many different forms and should not be construed as being limited to the embodiments of the present disclosure set forth herein. In order to clearly describe the present disclosure, portions that are not relevant to the description of the present disclosure are omitted, and similar reference numerals are assigned to similar elements throughout the present specification. In addition, the same reference numerals designate the same components throughout the drawings.

Throughout the present specification, when a part is referred to as being "connected to" another part, it may be "directly connected to" the other part or be "electrically connected to" the other part through an intervening element. In addition, when an element is referred to as "including" a component, the element may additionally include other components rather than excluding other components as long as there is no particular opposing recitation.

As used herein, phrases such as "in some embodiments" or "in an embodiment" does not necessarily indicate the same embodiment.

Some embodiments may be represented by block components and various process operations. All or some of such functional blocks may be implemented by various numbers of hardware and/or software components that perform particular functions. For example, functional blocks of the present disclosure may be implemented by using one or more processors or microprocessors, or circuit elements for intended functions. For example, the functional blocks of the present disclosure may be implemented by using various programming or scripting languages. The functional blocks may be implemented as an algorithm to be executed by one or more processors. In addition, the present disclosure may employ related-art techniques for electronic configuration, signal processing, and/or data processing, etc. Terms such as 'module', 'component', and the like may be used broadly and may not be limited to mechanical and physical elements.

Also, connection lines or connection members between components illustrated in the drawings are merely illustrative of functional connections and/or physical or circuit connections. In an actual device, connections between components may be represented by various functional connections, physical connections, or circuit connections that are replaceable or added.

In addition, the expression 'at least one of a, b, or c' indicates only a, only b, only c, both a and b, both a and c, both b and c, or all of a, b, and c.

Embodiments of the present disclosure provide a video call processing method, a display device for performing the method, a mobile device for performing the method, a server for performing the method, and a computer-readable storage medium in which a program for performing the method is stored. The embodiments of the present disclosure relate a video call processing method for allowing a display device to substitute for one of mobile devices that are performing a video call, a display device for performing the method, a mobile device for performing the method, a server for performing the method, and a computer-readable storage medium in which a program for performing the method is stored.

In the embodiments of the present disclosure, portable electronic devices are referred to as 'mobile devices'. In addition, electronic devices capable of providing a large screen through a larger display than that of mobile devices are hereinafter referred to as 'display devices'.

In detail, a mobile device refers to an electronic device that may be carried by a user, and may be a wearable device, a smart phone, a tablet personal computer (PC), a personal digital assistant (PDA), a laptop computer, a media player, or the like. In addition, a display device refers to an electronic device including a larger display than that of the above-described mobile device, and thus capable of providing a user with a larger screen than that of the mobile device. For example, the display device may be a tablet PC, a PDA, a laptop computer, a media player, a television (TV), a digital TV, a smart TV, a digital signage, digital signage, or the like. In addition, the display device may be portable or may have a form that can be installed in a fixed position.

In the attached drawings, like elements are illustrated by using like reference numerals. In addition, throughout the detailed description, the same components are described with the same terms.

Hereinafter, with reference to the accompanying drawings, a video call processing method, a display device performing the method, a mobile device performing the method, a server performing the method, and a computer-readable storage medium in which a program for performing the method is stored, according to embodiments of the present disclosure, will be described in detail.

FIG. 1 is a diagram illustrating a display device that is connected, through a communication network, to one of two mobile devices that are performing a video call with each other.

In an embodiment of the present disclosure, a video call refers to a situation in which a plurality of users remotely located from each other are having a conversation while looking at the face of each other on screens of a plurality of electronic devices, respectively. In addition, the term 'video call' mentioned in the embodiments of the present disclosure may be applied to all cases in which users remotely located from each other are communicating with each other while receiving an image of each other, such as video conferencing, non-face-to-face communication, or non-face-to-face education, and may refer to all cases in which a plurality of users remotely located from each other are communicating with each other while looking at an image of each other. Here, an image output from an electronic device performing a video call does not necessarily have to contain the face of a user engaging in the video call, and may be an image of an environment of the user engaging in the video call, or an image provided by the user.

In general, a video call may be performed by using each of two different mobile devices. Alternatively, three or more users remotely located from each other may perform a video call with each other by using three or more electronic devices, respectively.

Hereinafter, a case in which one user (hereinafter, referred to as 'user') and another user (hereinafter, referred to as 'counterpart') are engaging in a video call with each other by using two electronic devices remotely located from each other is described and illustrated as an example.

Referring to FIG. 1, a video call is being performed between a mobile device 101 and a mobile device 102, which are electronic devices remotely located from each other. Here, the mobile device 102 refers to a mobile device of a counterpart engaging in the video call with a user of the mobile device 101. In addition, the video call may be performed through a communication service such as 3G, 4G, or 5G. Alternatively, the video call may be performed through a certain application (e.g., a video call application, etc.) provided through a server of a service provider. Hereinafter, for convenience of description, the mobile device 102 of the counterpart engaging in the video call with the user of the mobile device 101 is referred to as the 'counterpart device 102'.

FIG. 1 illustrates an example in which the mobile device 101 and the counterpart device 102 are smart phones, and a display device 103 is a TV, particularly, a smart TV.

Referring to FIG. 1, the video call may be made between User A 117 and User B 127, and may be performed by using the mobile device 101 of User A 117 and the mobile device 102 of User B 127. Accordingly, with respect to the mobile device 101, the mobile device 102 may be referred to as a 'counterpart device'.

In addition, in the accompanying drawings including FIG. 1 and their detailed descriptions, for convenience of description, an image of User A 117, who is using the mobile device 101, may be referred to as a 'first image', and an image of User B 127 may be referred to as a 'second image'. In detail, when one of the two users who are engaging in the video call with each other has requested device substitution in the video call, the first image may be an image of the user who has requested the device substitution in the video call, and the second image may be an image of the other user who has not requested the device substitution in the video call.

In general, when the video call is initiated, the mobile device 101 of User A 117 displays a video call screen 111 including an image 112 of User B and an image 113 of User A. In addition, the counterpart device 102, which is the mobile device of User B 127, displays a screen 121 including an image 122 of User A 117 and an image 123 of User B 127. In general, during a video call, one user (e.g., User A 117) may receive an image of a counterpart (e.g., User B 127) engaging in the video call with the user, on a main screen of a screen output from a mobile device of the user (e.g., the mobile device 101). In addition, the screen 111 and the screen 121 may respectively include menu bars 114 and 124 each including at least one menu for controlling the video call.

Accordingly, User A 117 may engage in the video call while looking at the face of User B 127, who is the counterpart of the video call.

In addition, because the main purpose of a video call is to have a conversation while looking at the face of a counterpart of the video call, a video call screen may include only an image of the counterpart according to an initial setting of a device or a request of a user. For example, the counterpart device 102 may display a video call screen including only the image 122 for User A 117, and the mobile device 101 may display a video call screen including only the image 112 of User B, who is the counterpart.

While the video call is performed between the mobile device 101 and the counterpart device 102, the mobile device 101 performing the video call may be substituted with the display device 103. For example, User A 117 may be the owner of the mobile device 101 and the display device 103, which are a plurality of electronic devices capable of connecting to each other. In this case, in order to conveniently engage in the video call on a larger screen, User A 117 may want to substitute the mobile device 101 with the display device 103 to perform the video call. When the mobile device 101 is substituted with the display device 103 to perform the video call, User A 117 may be able to receive a video call screen through a larger screen 131 of the display device 103.

In the above-described example, User B 127 may not expect that the mobile device 101 is substituted with the display device 103 to perform the video call on the side of User A 117. In this case, the privacy of User B 127 may be violated, and such privacy violation is described in detail below with reference to FIG. 2.

Figure 2:
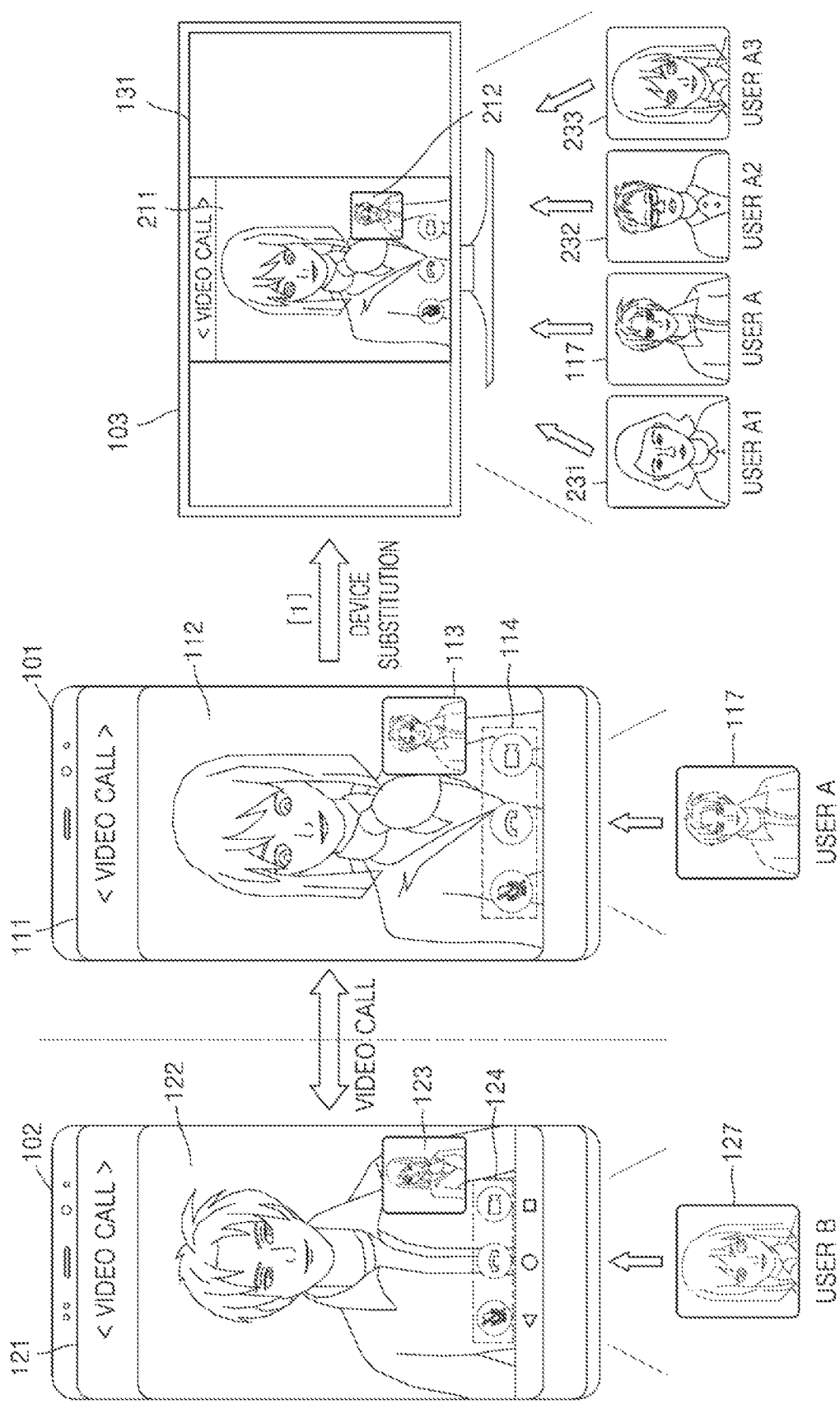
FIG. 2 is a diagram for describing users engaging in a video call when a display device substitutes for a device to perform the video call as illustrated in FIG. 1.

FIG. 2 is a diagram for describing users engaging in a video call when a display device substitutes for a device to perform the video call as illustrated in FIG. 1. In FIG. 2, the same elements as those of FIG. 1 are illustrated by using the same reference numerals.

Referring to FIG. 2, the display device 103 may substitute for the mobile device 101 to perform the video call on the side of User A 117 according to a request of User A 117.

In detail, User A 117 may transmit a user input for requesting device substitution through a user interface (not shown) of the mobile device 101. Then, the mobile device 101 may perform device substitution such that the video call is performed by the display device 103 capable of connecting to the mobile device 101. Alternatively, User A 117 may transmit a user input for requesting device substitution through a user interface (not shown) of the display device 103. Then, the display device 103 may request the mobile device 101 to control the video call being currently performed to be performed by the display device 103.

In detail, the above-described device substitution in the video call may mean that the operating agent performing the video call, i.e., the mobile device 101, is substituted with the display device 103. When the device substitution in the video call is performed, the display device 103 may output the video call screen that was output by the mobile device 101, and perform, in place of the mobile device 101, an operation of obtaining an image of the User A. In addition, the display device 103 may also perform audio output for the video call.

For the above-described device substitution, the mobile device 101 and the display device 103 may be connected to each other through a wired/wireless communication network. In addition, in an embodiment of the present disclosure, a video call function or a video call service may be provided by using the mobile device 101 and the display device 103.

Here, the communication network for connecting the mobile device 101 to the display device 103 refers to a wired/wireless communication network through which certain data may be transmitted and received. For example, the communication network may be established according to a wireless network standard, for example, a communication network conforming to a communication standard such as local area network (LAN), wide area network (WAN), wireless LAN (WLAN) (Wi-Fi), wireless broadband (Wi-Bro), code-division multiple access (CDMA), wideband CDMA (WCDMA), near-field communication (NFC), Bluetooth, or 3G, 4G, and/or 5G. Also, the communication network may be a wired network for connecting the mobile device 101 to the display device 103 by using a wired cable, such as a High-Definition Multimedia Interface (HDMI) cable or a Mobile High-Definition Link (MHL) cable.

When the display device 103 substitutes for the mobile device 101 to perform the video call on the side of User A 117, the video call screen 111 that was output by the mobile device 101 may be output on the screen of the display device 103. That is, the display device 103 may display the video call screen 131 corresponding to the video call screen 111. Accordingly, the display device 103 may output the face of User B 127, which is the video call counterpart of the user A 117, on a main screen 211 of the video call screen 131.

As described above, the display device 103 may be an electronic device having a larger screen size than that of the mobile device 101, and may be an electronic device that may be used by a plurality of users.

For example, because the mobile device 101 is usually used by only a particular user (e.g., User A 117 who is the owner of the mobile device 101), the screen of the mobile device 101 is usually viewed by User A 117. However, the display device 103 may be usually used by a plurality of users present in a space in which the display device 103 is located, for example, family members of a household in which the display device 103 is located, or people in the space in which the display device 103 is located. Accordingly, the screen of the display device 103 may be viewed by not only User A 117 but also User A1 231, User A2 232, and User A3 233, who are a plurality of users.

User B 127 is unable to recognize the device substitution in the video call on the side of User A 117, and thus unable to recognize that the video call screen including the face of User B 127 is being viewed by the plurality of users other than User A 117. Also, in general, User B 127 recognizes that only User A 117, who is the counterpart of the video call, is engaging the video call while looking at the face of User B 127.

In the above-described case, User A1, User A2, and User A3, who are the plurality of users, may view an image of the face of User B 127 regardless of the intention of user B 127, and thus the privacy of User B 127 may be violated. In detail, User B 127 may think that only User A 117 is viewing an image (e.g., 112) of the face of User B 127, and may not know that User A1 231, User A2 232, and User A3 233 are also viewing the image. In this case, User B 127 may not want User A1 231, User A2 232, and User A3 233 to view the image (e.g., 112) of the face of User B 127.

That is, when device substitution is requested by one user during a video call, a plurality of users may view an image of the user who did not request the device substitution regardless of the intention of the user, and thus the privacy of the user who did not request the device substitution may be violated.

Hereinafter, embodiments are described in detail with reference to FIGS. 3 to 28, in which the privacy of a user who did not request device substitution (e.g., User B 127 in the above-described example) is prevented from being violated as a result of the device substitution during a video call as described above.

For reference, in FIGS. 3 to 28 to be described below, the same elements are illustrated by using the same reference numerals. In addition, in FIGS. 3 to 28, the same elements as in FIGS. 1 and 2 are illustrated by using the same reference numerals, and redundant descriptions are omitted.

Figure 3:
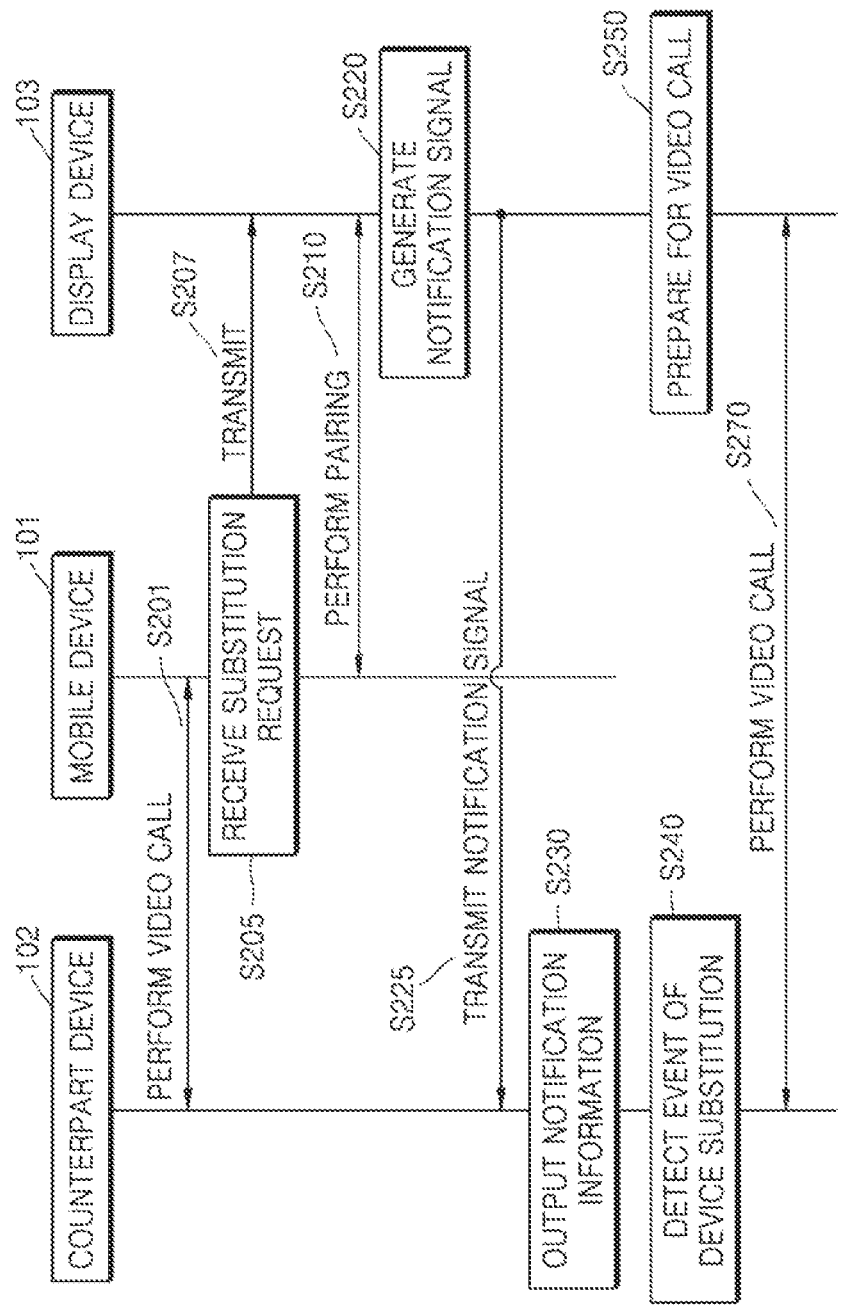
FIG. 3 is a diagram schematically illustrating a video call processing method according to an embodiment of the present disclosure.

FIG. 3 is a diagram schematically illustrating a video call processing method according to an embodiment of the present disclosure.

Referring to FIG. 3, first, the mobile device 101 performs a video call with the counterpart device 102 (S201). The video call may be initiated and performed by using a general method of performing a video call. For example, a user input for requesting a video call may be received through any one of the mobile device 101 or the counterpart device 102. Then, the device having received the user input may initiate a video call by executing its own call function and an application for providing a video call service. Accordingly, the mobile device 101 may initiate and perform a video call with the counterpart device 102. Hereinafter, the user of the mobile device 101 and the display device 103 is referred to as 'User A' as in FIGS. 1 and 2, and the user of the counterpart device 102 is referred to as 'User B' as in FIGS. 1 and 2.

After the video call is initiated, a device substitution request may be received from the user (e.g., User A) of the mobile device 101 (S205). The term 'device substitution request' refers to a request for the video call being executed on the mobile device 101 to be performed through the display device 103 as described above with reference to FIG. 2. In addition, hereinafter, for convenience of description, the term 'request for substitution of a device performing a video call' is simply referred to as 'substitution request'.

In detail, the user of the mobile device 101 and the display device 103 may be User A 117 described above with reference to FIG. 2, and User A 117 may input, to at least one of the mobile device 101 and the display device 103, a user input for requesting device substitution. FIG. 3 illustrates an example in which a device substitution request is received through the mobile device 101. In addition, when the device substitution request is received by the display device 103, the display device 103 may transmit, to the mobile device 101 connected thereto through a communication network, the received device substitution request.

Based on the reception of the substitution request, the mobile device 101 may transmit the substitution request to the display device 103, which is to substitute for the mobile device 101 (S207). In detail, based on the substitution request being received (S205), the mobile device 101 may transmit the substitution request to the display device 103, which is to substitute for the mobile device 101 (S207).

In addition, in order for the display device 103 to substitute for the mobile device 101 and perform the video call, the mobile device 101 may establish a communication connection between the mobile device 101 and the display device 103. An operation of establishing such a communication connection may be referred to as a 'pairing operation'. Here, the term 'pairing' may refer to establishing a wireless communication network by transmitting and receiving data used for a wireless communication connection between the mobile device 101 and the display device 103. When pairing is completed, the mobile device 101 and the display device 103 may transmit and receive, to and from each other, data used for performing the video call.

When there is no communication connection between the mobile device 101 and the display device 103, a pairing operation between the mobile device 101 and the display device 103 may be performed (S210). That is, in order to perform a video call operation, the mobile device 101 and the display device 103 need to be connected to each other through a wired/wireless communication network. When a wired/wireless communication connection is established between the mobile device 101 and the display device 103, the mobile device 101 and the display device 103 may not perform a separate pairing operation (e.g., operation S210).

In response to the substitution request received in operation S207, the display device 103 generates a notification signal corresponding to the substitution request (S220). Here, the notification signal may be information for informing the counterpart device 102 performing the video call with the mobile device 101 that device substitution in the video call has been requested. In detail, the notification signal may include information about the display device 103, which is to substitute for the mobile device 101, and information for informing of device substitution. Here, the information about the display device 103, which is to substitute for the mobile device 101, may include information about a product specification of the display device, a product model of the display device, a product type of the display device, a display size of the display device, and the like. Hereinafter, for convenience of description, the above-described 'information about the display device 103' is referred to as 'display device information'.

Also, the notification signal may be generated by the mobile device 101. When the mobile device 101 performs the pairing operation (S210) with the display device 103, the mobile device 101 may obtain and store the information about the display device 103 (e.g., the above-described information about a product specification of the display device, a product model of the display device, a product type of the display device, a display size of the display device, and the like). When the substitution request is received, in response thereto, the mobile device 101 may generate the notification signal based on the pre-stored information about the display device 103. However, for convenience of description, in the accompanying drawings including FIG. 3 and their detailed descriptions, an example is illustrated and described in which the notification signal is generated by the display device 103.

The notification signal including the display device information generated in operation S220 is transmitted to the counterpart device 102 (S225). In detail, the display device 103 may transmit the notification signal to a server (not shown) that relays the video call service. Then, the server (not shown) may transmit the received notification signal to the counterpart device 102 of the video call. Alternatively, the display device 103 may transmit the notification signal generated in operation S220 to the mobile device 101. Then, the mobile device 101 may transmit the notification signal to the counterpart device 102. As another example, when the display device 103 is able to directly communicate with the counterpart device 102, the display device 103 may directly transmit the notification signal to the counterpart device 102.

In addition, the notification signal may be generated by the above-described server (not shown) that relays the video call service. In detail, the server (not shown) may receive, from the display device 103 or the mobile device 101, the information about the display device 103 (e.g., the above-described information about a product specification of the display device, a product model of the display device, a product type of the display device, a display size of the display device, and the like). Then, the server (not shown) may generate the notification signal based on the received information about the display device 103. In this case, the notification signal may be transmitted from the server (not shown) to the counterpart device 102.

The counterpart device 102 having received the notification signal may output notification information corresponding to the notification signal to allow the user of the counterpart device 102 (e.g., user B 127 of FIG. 2) to visually and/or aurally recognize the notification information (S230). Here, the notification information may be output as a combination of at least one of a text message, an identification mark, a marker, an icon, and a notification sound, for indicating that the video call is to be performed by the display device 103.

For example, the notification information may be a text message stating, 'The counterpart of the video call has changed the display. The device may be viewed by multiple users'. As another example, the notification information may be a text message stating, 'The counterpart of the video call has changed the display to a Samsung Smart TV'. As another example, the notification information may be a text message stating, 'The video call device has been changed to a Samsung Smart TV (model number: XXXX)'. As another example, the notification information may include a message for asking the user of the counterpart device 102 whether to continue the video call or to maintain image transmission. For example, the notification information may be a text message stating, 'The counterpart of the video call has changed the display to a Samsung Smart TV. Would you like to continue the video call?', or 'The counterpart of the video call has changed the display to a Samsung Smart TV. Would you like to continue sending images?'.

Accordingly, the user of the counterpart device 102 may recognize that the video call screen may be output from the mobile device 101 to the display device 103 regardless of the intention of the user of the counterpart device 102, and thus a plurality of users may view an image of the user of the counterpart device 102. Accordingly, the user of the counterpart device 102 may be provided with the notification information and decide whether to continue the video call or continue transmission of images of the user.

Also, after outputting the notification information, the counterpart device 102 may detect an event indicating acceptance of device substitution (S240). The event indicating acceptance of device substitution is described in detail below with reference to FIG. 4.

Figure 4:
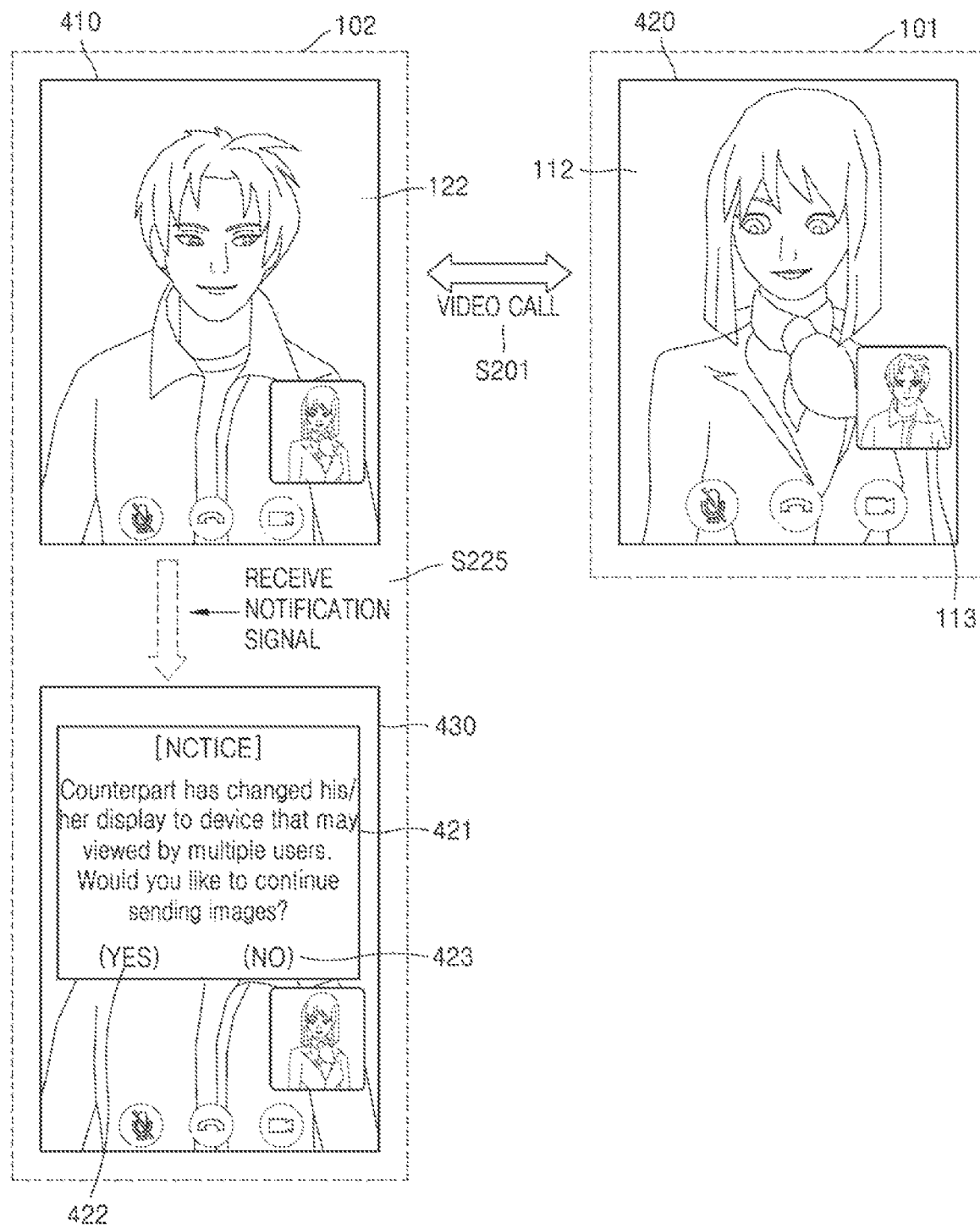
FIG. 4 is a diagram for describing operations performed in the video call processing method of FIG. 3.

FIG. 4 is a diagram for describing operations performed in the video call processing method described with reference to FIG. 3. In FIG. 4, the same elements as those of FIGS. 2 and 3 are illustrated by using the same reference numerals.

FIG. 4 illustrates an example of screens output from the counterpart device 102 and the mobile device 101, according to an embodiment of the present disclosure.

Referring to FIG. 4, when a video call is performed (S201), the counterpart device 102 outputs a video call screen 410, and the mobile device 101 outputs a video call screen 420. Here, the video call screen 410 may correspond to the screen 121 described above with reference to FIG. 1, and the video call screen 420 may correspond to the screen 111 described above with reference to FIG. 1.

When a notification signal is transmitted to the counterpart device 102 (S225), the counterpart device 102 may display a pop-up window 421 including notification information. FIG. 4 illustrates an example in which the counterpart device 102 outputs notification information, i.e., displays a screen 430 in which the pop-up window 421 including the notification information is on the existing video call screen. In addition, the pop-up window 421 illustrated in FIG. 4 may be output in various forms other than a pop-up window, such as a sub-screen or a partial screen.

For example, the pop-up window 421 may include a text message stating, 'The counterpart has changed the display. The device may be viewed by multiple users. Would you like to continue sending images?'. Also, the pop-up window 421 may include a plurality of menu keys 422 and 423 for receiving a user input.

For example, when the user of the counterpart device 102 (e.g., User B of FIG. 2) having checked the pop-up window 421 does not want his/her images to be viewed by a plurality of users, the user may input, to the counterpart device 102, a user input for selecting a 'No' key 423. Then, the counterpart device 102 may control images of the user (e.g., User B of FIG. 2) not to be transmitted to the mobile device 101 and the display device 103.

Also, the counterpart device 102 may receive, from a user (e.g., User B of FIG. 2), a user input for selecting a 'Yes' key 422. Then, the counterpart device 102 may continue transmitting images of the user (e.g., User B of FIG. 2) to at least one of the mobile device 101 and the display device 103.

In operation S240 described above, the 'event indicating acceptance of device substitution' may be a user input for selecting the 'Yes' key 422. Hereinafter, for convenience of description, the term 'event indicating acceptance of device substitution' is referred to as 'first event'.

Alternatively, the counterpart device 102 may not output the 'Yes' key 422 and the 'No' key 423, but output only a message, such as "The counterpart of the video call has changed the display. The device may be viewed by multiple users'. In this case, when a user input for requesting termination of the video call or a switch to a voice call is not received from the user of the counterpart device 102 for a set period of time (e.g., 10 seconds), the counterpart device 102 may recognize that an event indicating acceptance of device substitution has occurred.

Alternatively, whether an 'event indicating acceptance of device substitution' is detected may be determined based on a setting of the counterpart device 102. For example, when the user of the counterpart device 102 values privacy protection, the counterpart device 102 may be initially set to terminate a video call when device substitution occurs.

When there is such an initial setting, the counterpart device 102 may terminate the video call by itself when a preset offset period of time has elapsed after a notification message is output. For example, the counterpart device 120 may output a text message stating, "The counterpart has changed the display. The device may be viewed by multiple users.', and then, after a preset offset period of time (e.g., 5 seconds) has elapsed, output a text message stating, 'Terminating the video call'. Then, the counterpart device 102 may then terminate the execution of the video call.

In addition, in an embodiment of the present disclosure, an 'offset period of time' may be determined based on a setting of an electronic device, a user preference of the electronic device, or a setting of a video call service provider.

Referring back to FIG. 3, the display device 103 may perform a preparation operation used for performing a video call according to the device substitution request received in operation S207 (S250). For example, in order to perform a video call, operations of obtaining an image to be included in a video call screen, establishing a communication connection to a server that provides a video call service, transmitting the obtained image, and the like may be required. Accordingly, the display device 103 allows such operations to be performed.

In detail, operation S250 may include activating a camera included in the display device 103 (operation not shown), obtaining an image of User A, who is the user of the mobile device 101, through the activated camera, and transmitting image data corresponding to the obtained image to the counterpart device 102. Also, when the display device 103 performs the video call through a certain application that provides a video call service, operation S250 may further include executing the application.

After the display device 103 completes the preparation operation for a video call, a video call between the counterpart device 102 and the display device 103 may be performed (S270).

In detail, the display device 103 may perform the video call only when a device substitution acceptance event is detected by the counterpart device 102 (S270). Alternatively, the display device 103 may perform the video call only when the counterpart device 102 does not request termination of the video call (S270).

Alternatively, when a signal notifying that a device substitution acceptance event (specifically, a first event) is detected is not transmitted from the counterpart device 102, the display device 103 may perform the video call such that a video call screen that does not include an image of the user of the counterpart device 102 is displayed by the display device 103 (S270).

Alternatively, when a preset offset period of time has elapsed after the notification signal is transmitted (S225), the display device 103 may perform the video call. In detail, when the first event is not detected but a user input for rejecting device substitution in the video call is also not received, the counterpart device 102 may determine that the user of the counterpart device 102 has implicitly accepted or permitted device substitution in the video call. In this case, the counterpart device 102 may not transmit any signal to the display device 103, for example, a signal for notifying of detection of the first event, and a signal for notifying of rejection of device substitution. In addition, when the counterpart device 102 determines that device substitution is implicitly accepted or permitted, image data regarding User B may be transmitted to the display device 103 or the mobile device 101. In addition, when a certain offset period of time has elapsed after the notification signal is transmitted (S225), the display device 103 may determine that the user of the counterpart device 102 does not reject device substitution, and perform the video call.

Figure 5:
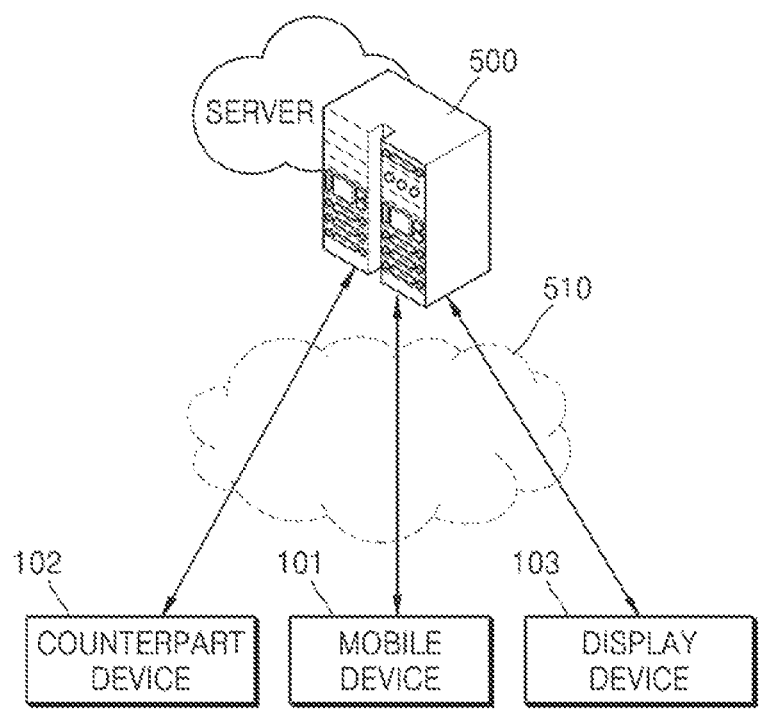
FIG. 5 is a diagram for describing electronic devices used to perform a video call processing method according to an embodiment of the present disclosure.

FIG. 5 is a diagram for describing electronic devices used to perform a video call processing method according to an embodiment of the present disclosure.

In the video call processing method according to an embodiment of the present disclosure described with reference to FIGS. 3 and 4, a video call may be performed through video call service relay by a server 500.

Referring to FIG. 5, the server 500 may communicate with the mobile device 101, the counterpart device 102, and the display device 103 through a wireless communication network 510.

For example, the server 500 may be a server that provides a video call or a video call service, or supports communication that may be required for a video call service. For example, the mobile device 101 and the counterpart device 102 may be connected to each other through a mobile communication network such as 3G, 4G, or 5G, and each of the mobile device 101 and the counterpart device 102 may perform a video call by using its own video call function. In this case, the server 500 may be a communication server that supports mobile communication according to a communication standard such as 3G, 4G, or 5G.

Also, the mobile device 101, the counterpart device 102, and the display device 103 may be connected to each other through an Internet communication network. In addition, each of the mobile device 101 and the counterpart device 102 may perform a video call through an application therein that provides a video call service. Also, an application that provides a video call service may be installed in the display device 103. Then, by using the respective applications, the mobile device 101, the counterpart device 102, and the display device 103 may perform a video call with each other and substitution in the video call. In this case, the server 500 may be a server that supports the applications. In detail, the server 500 may be a server of a user who creates and/or distributes the applications.

As described above, the operations of the above-described video call processing method may be performed by using communication relay by the server 500. Although a communication relay operation of the server 500 is not illustrated in FIG. 3, transmission and reception of data or signals between two different devices may include the communication relay operation of the server 500. In detail, the server 500 may be in charge of transmitting data or signals to support execution of a video call service (or execution of substitution).

For example, the server 500 may perform operations of generating, transmitting, and/or delivering the above-described notification signal. As another example, the server 500 may perform an operation of delivering the substitution request described above with reference to operation S205, from one device (e.g., a mobile device) to another device (e.g., a display device). As another example, the server 500 may receive, from the mobile device 102, a signal for notifying that the event described above with reference to operation S240 has occurred, and deliver the received signal to at least one of the mobile device 101 and the display device 103. In addition, the server 500 may transmit or deliver, to at least one of the mobile device 101, the counterpart device 102, and the display device 103, various types of data and signals used to perform a video call service.

An example of the communication relay operation of the server 500 is described below with reference to FIG. 6.

Figure 6:
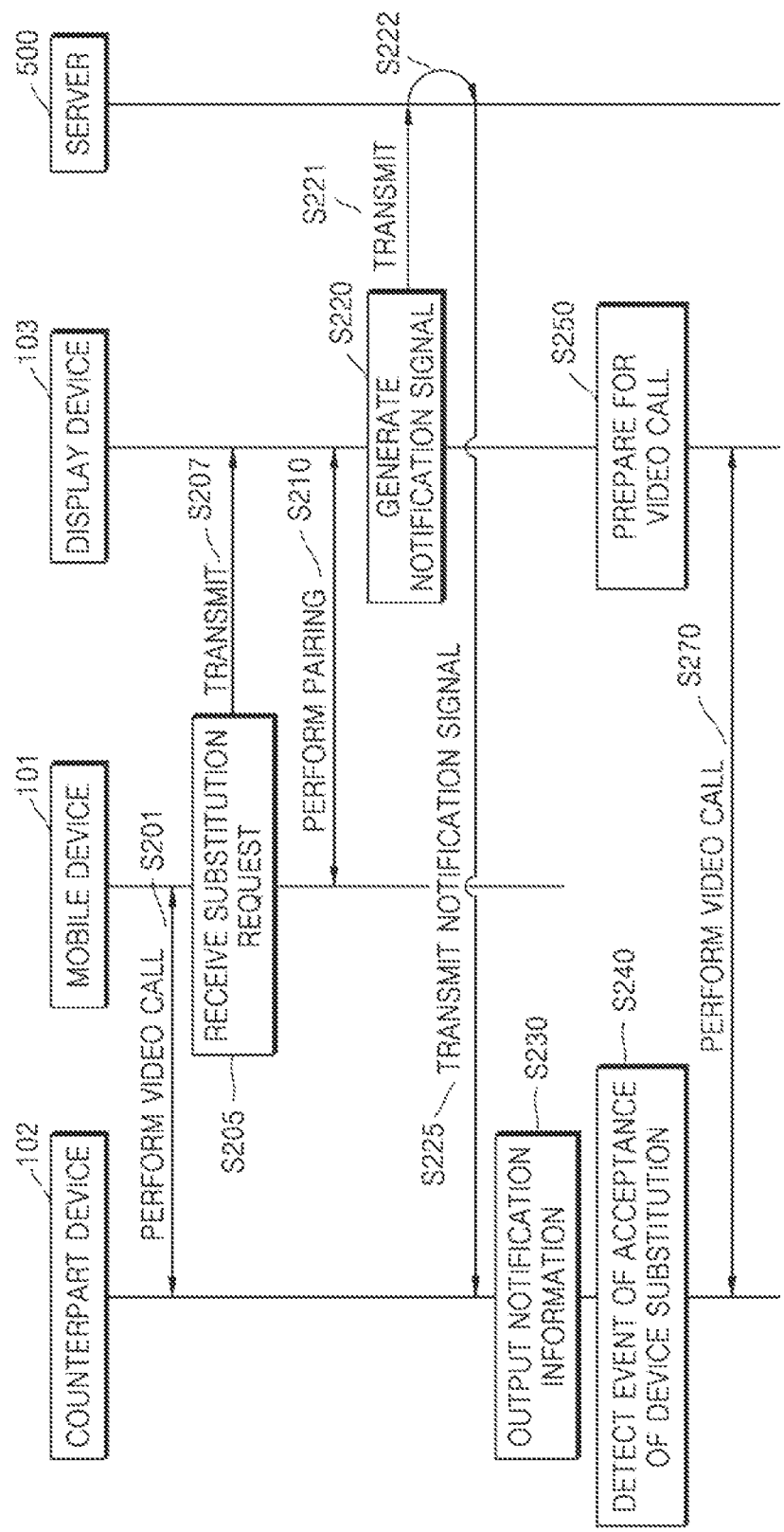
FIG. 6 is a diagram illustrating in more detail the video call processing method illustrated in FIG. 3.

FIG. 6 is a diagram illustrating in more detail the video call processing method illustrated in FIG. 3. In FIG. 6, the same elements as those of FIGS. 3 and 5 are illustrated by using the same reference numerals, and thus redundant descriptions are omitted.

Referring to FIG. 6, in transmitting a notification signal generated by the display device 103 to the counterpart device 102, communication relay by the server 500 may be used. For example, the display device 103 may generate a notification signal and transmit the notification signal to the server 500 (S221). Then, the server 500 may transmit the received notification signal to the counterpart device 102 (S222). In addition, the accompanying drawings may illustrate that, when data or signals are transmitted and received between two different devices, the communication relay by the server 500 is omitted and the devices directly communicate with each other.

For example, as illustrated in FIG. 6, when the video call is performed between the mobile device 101 and the counterpart device 102 (S201), data for the video call may not be directly transmitted and received between the mobile device 101 and the counterpart device 102, but may be transmitted and received through communication relay by the server 500. In detail, the mobile device 101 may transmit, to the server 500, image data regarding User A that may be required for the video call, and then the server 500 may transmit the image data to the counterpart device 102. In addition, the counterpart device 102 may transmit, to the server 500, image data regarding User B that may be required for the video call, and then the server 500 may transmit the image data to the mobile device 101.

As another example, in operation S270 illustrated in FIG. 6, in performing the video call between the counterpart device 102 and the display device 103, the display device 103 may transmit, to the server 500, image data regarding User A obtained by the display device 103. Then, the server 500 may transmit the image data to the counterpart device 102. In addition, the counterpart device 102 may transmit, to the server 500, image data regarding User B that may be required for the video call, and then the server 500 may transmit the image data to the display device 103.

As another example, in operation S270 illustrated in FIG. 6, the counterpart device 102 and the mobile device 101 may communicate with each other through communication relay by the server, and the mobile device 101 and the display device 103 may communicate with each other through a short-range communication network (e.g., a Bluetooth communication network). In this case, when the video call is started between the counterpart device 102 and the display device 103, the display device 103 may transmit the image data regarding User A obtained by the display device 103 to the mobile device 101 through the short-range communication network (e.g., a Bluetooth communication network). Then, the mobile device 101 may transmit the image data to the server 500, and then the server 500 may transmit the received image data (specifically, the image data regarding User A obtained by the display device 103) to the counterpart device 102.

As described above, although an example in which one electronic device and another electronic device communicate with each other is illustrated and described in in an embodiment of the present disclosure, communication relay by the communication server 500 may be additionally used.

Hereinafter, a display device for performing the video call processing method according to an embodiment of the present disclosure is described in detail with reference to FIGS. 7 to 8.

Figure 7:
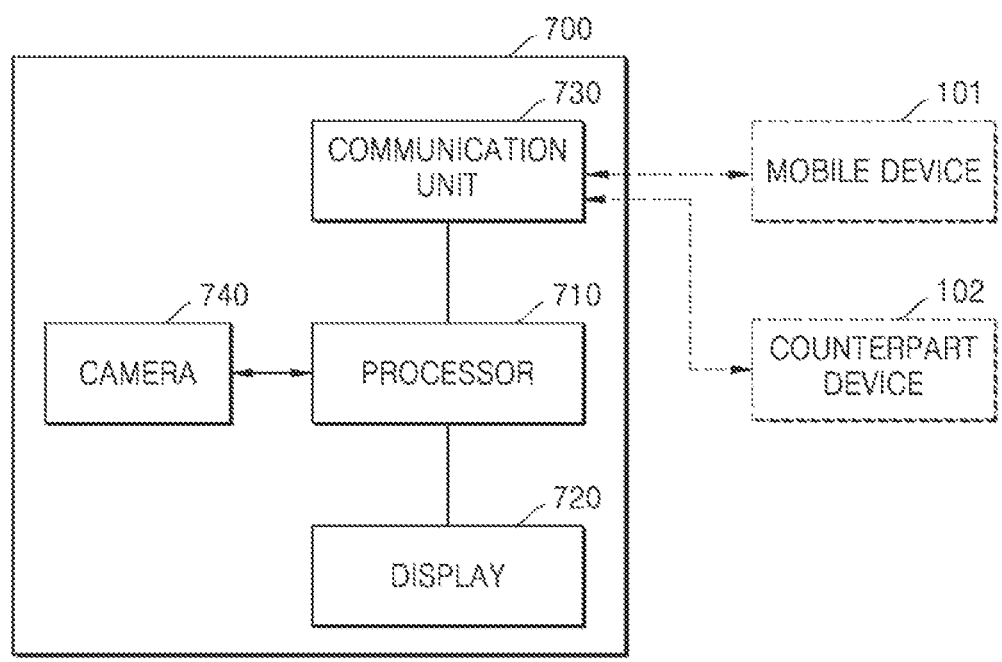
FIG. 7 is a block diagram illustrating a display device according to an embodiment of the present disclosure.

FIG. 7 is a block diagram illustrating a display device according to an embodiment of the present disclosure. A display device 700 illustrated in FIG. 7 may correspond to the display device 103 illustrated in FIGS. 1 to 6. Accordingly, in describing operations of the display device 700, the descriptions provided above with reference to FIGS. 1 to 6 are omitted.

Referring to FIG. 7, the display device 700 includes a processor 710, a display 720, a communication unit 730, and a camera 740.

In an embodiment of the present disclosure, the processor 710 executes at least one instruction to receive a substitution request that the video call being performed by the mobile device 101 be performed by the display device, generate a notification signal corresponding to the substitution request in response to the substitution request, control, before a video call screen including an image of the counterpart of the video call is output through the display, the notification signal to be transmitted to the counterpart device 102 of the video call.

In detail, the processor 710 performs at least one instruction to perform control such that an intended operation is performed. Here, the at least one instruction may be stored in an internal memory (not shown) included in the processor 710 or a memory (not shown) included in the display device 700 separately from the processor 710.

In detail, the processor 710 may perform the at least one instruction to control at least one component included in the display device 700 such that the intended operation is performed. Therefore, although an example in which the processor 710 performs certain operations is described, it may mean that the processor 710 controls at least one component included in the display device 700 to perform the operations. In addition, although it is described that the display device 700 performs certain operations, this may mean that the operations are performed under control by the processor 710. Also, although an example in which the processor 710 is composed of one processor is illustrated and described, the processor 710 may include a plurality of processors.

In detail, the processor 710 may include random-access memory (RAM) (not shown), which stores signals or data input from a source external to the display device 700 or is used as a storage for various operations performed by the display device 700, read-only memory (ROM) (not shown) storing a control program for controlling the display device 700 and/or a plurality of instructions, and at least one processor (not shown). The processor (not shown) may include a graphics processing unit (GPU) (not shown) for graphics processing on video. The processor (not shown) may be implemented as a system on a chip (SoC) in which a core (not shown) and the GPU (not shown) are integrated. In addition, the processor 710 may include a single processor core (single-core) or a plurality of processor cores (multi-core). For example, the processor 710 may be dual-core, triple-core, quad-core, hexa-core, octa-core, deca-core, dodeca-core, hexadecimal-core, etc.

In an embodiment of the present disclosure, the processor 710 may perform a video call with the counterpart device 102 based on the received substitution request. Here, the video call may be performed through a video call function of the display device 700 or an application for providing a video call service. For example, the application for providing a video call service may be referred to as a video call application.

In this case, the processor 710 may store the video call application. The video call application may be distributed online (e.g., downloaded or uploaded) through an application store (e.g., Play Store™) or directly between two user devices (e.g., a smart phone and or a smart TV). Online distribution may be performed through a server of a manufacturer, a server of an application store, a relay server, or the like.

In an embodiment of the present disclosure, by installing a video call application in at least two of the mobile device 101, the counterpart device 102, and the display device 800, and using the video call application, a video call between the two devices may be performed.

The display 720 outputs an image on the screen. In detail, the display 720 may output an image corresponding to video data through a display panel (not shown) included therein so as to allow the user to visually recognize the video data.

In an embodiment of the present disclosure, while the video call is performed according to the device substitution request, the display 720 may output a video call screen.

The communication unit 730 communicates with another electronic device (not shown) through at least one wired or wireless communication network. In an embodiment of the present disclosure, the communication unit 730 communicates with at least one of the mobile device 101 and the counterpart device 102. In addition, in order to transmit and receive certain data to and from at least one of the mobile device 101 and the counterpart device 102, the communication unit 730 may communicate with a server (not shown in FIG. 7) (e.g., the server 500 illustrated in FIG. 5).

The communication unit 730 may communicate with an external device (e.g., at least one of the mobile device 101, the counterpart device 102, and the server (not shown)) through a wired/wireless communication network. In detail, the communication unit 730 may include at least one communication module, a communication circuit, and the like, and may transmit and receive data to and from an external device through the communication module and/or the communication circuit.

In detail, the communication unit 730 may include at least one short-distance communication module (not shown) configured to perform communication according to a communication standard such as Bluetooth, Wi-Fi, Bluetooth Low Energy (BLE), near-field communication (NFC)/radio frequency identification (RFID), Wi-Fi Direct, ultra-wideband (UWB), or Zigbee. Here, the short-distance communication module (not shown) may be referred to as a 'short-range communication unit (not shown)'.

In addition, the communication unit 730 may further include a long-range communication module (not shown) configured to perform communication with a server (not shown) for supporting long-range communication according to a long-range communication standard. In detail, the communication unit 730 may include a long-range communication module (not shown) configured to perform communication through a network for Internet communication. Also, the communication unit 730 may include a communication network conforming to a communication standard such as 3G, 4G, and/or 5G. In addition, the long-range communication module (not shown) may be referred to as a 'long-range communication unit (not shown)'.

In addition, the communication unit 730 may include at least one port (not shown) for connecting to the mobile device 101 through a cable in order to communicate with the mobile device 101 in a wired manner. For example, the communication unit 730 may include a cable connection port such as an HDMI port (not shown).

The camera 740 may include an image sensor (not shown) to obtain an image frame, such as a still image or a moving image, through an image sensor in a video call mode or an image-capture mode.

Also, the display device 700 may include one camera. Also, the display device 700 may include a plurality of cameras arranged at different positions. When the display device 700 includes a plurality of cameras, the display device 700 allows the user to select any one of the plurality of cameras for a video call, based on a setting of the display device 700 or a user input.

Also, a camera for obtaining an image of a user may be provided separately from the display device 700, rather than being included in the display device 700. For example, the camera may be an external camera (not shown) on one side or adjacent to the display device 700 to capture an image of the front of the display device 700. In this case, the external camera (not shown) and the display device 700 may be connected to each other through a wired or wireless signal line, and the external camera (not shown) may obtain an image of the user on a video call under control by the display device 700.

Hereinafter, for convenience of description, an example is illustrated and described in which the camera for obtaining an image of the user for a video call is included in the display device 700.

Hereinafter, the configuration of the display device 700 is described in more detail with reference to FIG. 8.

Figure 8:
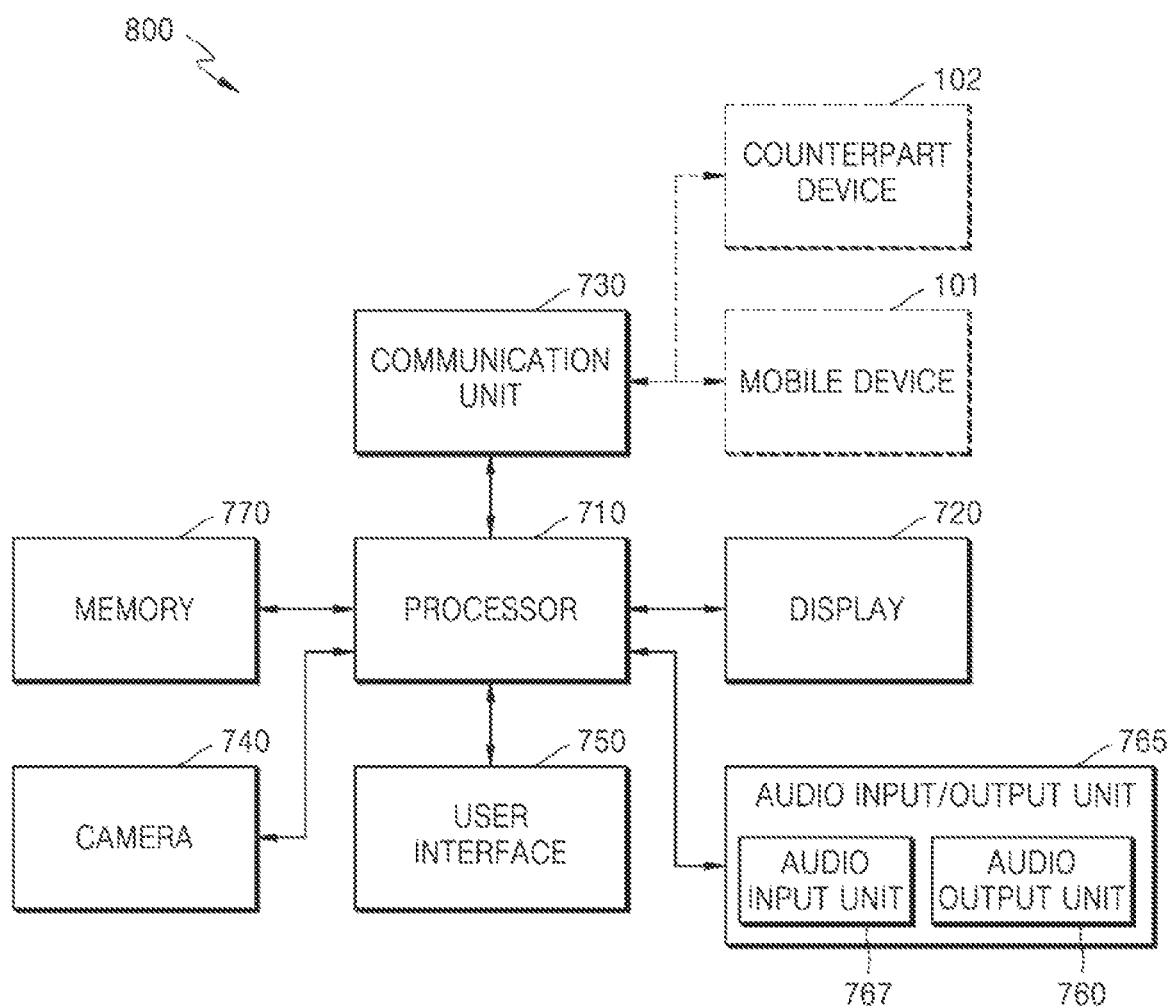
FIG. 8 is another block diagram illustrating a display device according to an embodiment of the present disclosure.

FIG. 8 is another block diagram illustrating a display device according to an embodiment of the present disclosure.

A display device 800 illustrated in FIG. 8 may correspond to the display device 700 illustrated in FIG. 7. Referring to FIG. 8, in addition to the components of the display device 700, the display device 800 may further include at least one of a memory 770, a user interface 750, and an audio input/output unit 765.

The memory 770 may store at least one instruction. Also, the memory 770 may store at least one instruction executable by the processor 710. Also, the memory 770 may store at least one program executable by the processor 710. Also, the memory 770 may store an application for providing a certain service. For example, the memory 770 may store a video call application.

In detail, the memory 770 may include at least one of a flash memory-type storage medium, a hard disk-type storage medium, a multimedia card micro-type storage medium, a card-type memory (e.g., SD or XD memory), RAM, static RAM (SRAM), ROM, electrically erasable programmable ROM (EEPROM), programmable ROM (PROM), magnetic memory, a magnetic disk, or an optical disc.

The user interface 750 may receive a user input for controlling the display device 800. The user interface 750 may include a user input device including a touch panel for detecting a touch of the user, a button for receiving a push operation of the user, a wheel for receiving a rotation operations of the user, a keyboard, a dome switch, etc., but is not limited thereto.

In addition, the user interface 750 may include a speech recognition device (not shown) for speech recognition. For example, the speech recognition device (not shown) may be a microphone, and may receive a voice command or voice request of a user. Accordingly, the processor 710 may control an operation corresponding to the voice command or voice request to be performed.

Also, the user interface 750 may include a motion sensor (not shown). For example, the motion sensor (not shown) may detect a motion of the display device 800 and receive the detected motion as a user input. Also, the speech recognition device (not shown) and the motion sensor (not shown) may not be included in the user interface 750, but may be included in the display device 800 as modules independent from the user interface 750.

Also, the user interface 750 may receive a user input through a remote controller or the like. In this case, the user interface 750 may include a communication module configured to receive, from the remote controller (not shown), a signal corresponding to a user input. For example, when the remote controller (not shown) transmits an infrared (IR) signal corresponding to a user input, the user interface 750 may include a communication module (not shown) capable of receiving an IR signal.

The audio input/output unit 765 may output an audio that is aurally recognizable by the user, or detect and/or receive an audio. In detail, the audio input/output unit 765 may include an audio output unit 760 and an audio input unit 767.

The audio output unit 760 outputs an audio under control by the processor 710.

In detail, the audio output unit 760 may output an audio (e.g., a voice or a sound) input through the communication unit 730.

In an embodiment of the present disclosure, the processor 710 may control an audio received from the counterpart device 102 of a video call to be output through the audio output unit 760 during a video call mode.

In addition, the audio output unit 760 may output an audio stored in the memory 770 under control by the processor 710. The audio output unit 760 may include at least one of a speaker (not shown), a headphone output port (not shown), or a Sony/Philips Digital Interface (S/PDIF) output port (not shown). The audio output unit 760 may include a combination of the speaker (not shown), the headphone output port (not shown), and the S/PDIF output port (not shown).

The audio input unit 767 receives an audio. In detail, the audio input unit 767 may include a microphone (not shown) that receives an audio, which is an external sound signal, and processes the audio into electrical voice data. For example, the microphone (not shown) included in the audio input unit 767 may receive a sound signal from an external device or a speaker, for example, a user engaging in a video call. Also, the microphone (not shown) included in the audio input unit 767 may use various denoising algorithms for removing noise generated in a process of receiving an external sound signal.

In an embodiment of the present disclosure, during the video call mode, under control by the processor 710, the audio input unit 767 may receive a sound signal including a voice of the user, remove noise from the received sound signal, and process the voice of the user to be recognized.

Figure 9:
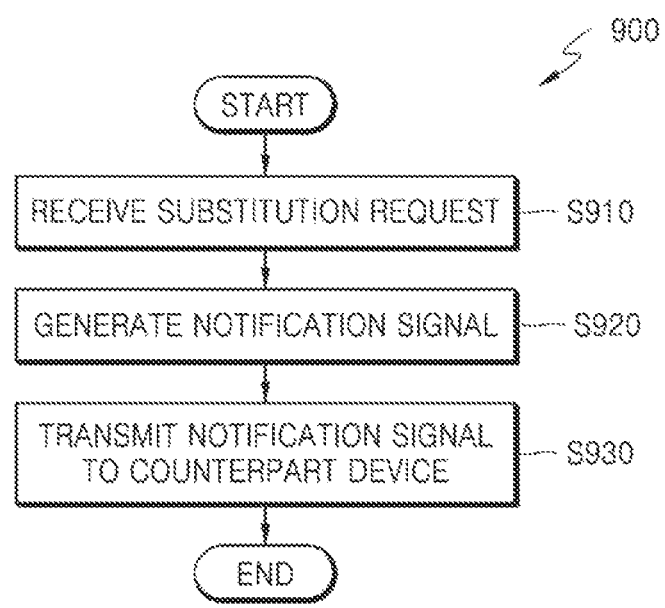
FIG. 9 is a flowchart illustrating a video call processing method according to an embodiment of the present disclosure.

FIG. 9 is a flowchart illustrating a video call processing method according to an embodiment of the present disclosure.

FIG. 9 illustrates a video call processing method 900 performed by a display device according to an embodiment of the present disclosure, for example, the display device 700 or 800. Also, FIG. 9 may be a flowchart illustrating the flow of operations performed by the display device according to an embodiment of the present disclosure, for example, the display device 700 or 800. Hereinafter, an example is described in which the video call processing method 900 is performed by the display device 800 described above with reference to FIG. 8.

Referring to FIG. 9, in the video call processing method 900, a substitution request for requesting that a video call being performed by a mobile device be performed by the display device 800 is received (S910). Here, operation S910 may correspond to operation S205 described above with reference to FIG. 3. In detail, the communication unit 730 may receive a video call substitution request transmitted from the mobile device 101, under control by the processor 710. Alternatively, the display device 800 may directly receive a substitution request through the user interface 750.

Then, in the video call processing method 900, a notification signal corresponding to the substitution request may be generated in response to the substitution request received in operation S910. Here, operation S920 may be performed by the processor 710.

For example, the mobile device 101 and the display device 800 store the same video call application installed therein. Assume that, in this case, the user of the mobile device 101 and the display device 800 (e.g., User A described above with reference to FIG. 2) inputs a device substitution request through the display device 800, while the mobile device 101 is performing a video call with the counterpart device 102 through the video call application. Then, the video call application of the display device 800 may transmit, to the mobile device 101, a device substitution request corresponding to the user input.

Also, assume that, in the above-described example, the user of the mobile device 101 (e.g., User A described above with reference to FIG. 2) inputs a device substitution request through the mobile device 101, while the mobile device 101 is performing a video call with the counterpart device 102 through the video call application. Then, the video call application of the mobile device 101 may transmit a device substitution request to the display device 800. Then, the display device 800 may perform operations used for device substitution in the video call, based on the received device substitution request. For example, the display device 800 may control a notification signal including information about the display device to be transmitted to the counterpart device 102. In detail, when the server 500 described above with reference to FIG. 5 performs communication relay, the display device 800 may transmit the notification signal to the server 500 such that the notification signal is transmitted from the server 500 to the counterpart device 102. Also, the display device 800 may activate a camera to perform a video call, and start preparing for the video call.

In addition, in the video call processing method 900, before a video call screen including an image of the counterpart of the video call is output by the display device 800, the notification signal generated in operation S920 may be transmitted to the counterpart device 102 of the video call. In detail, the processor 710 may control the communication unit 730 to transmit the notification signal generated in operation S920 to the counterpart device 102 of the video call, before the video call screen including the image of the counterpart of the video call is output by the display device 800.

In the video call processing method 900 according to an embodiment of the present disclosure, a notification signal for notifying of device substitution is provided to the counterpart device 102, before the display device 800 displays a video call screen including an image of User B, who is the user of the counterpart device 102. Accordingly, it is possible to prevent the display device 800 from outputting the video call screen including the image of User B regardless of the intention of User B. Accordingly, it is possible to prevent the privacy of user B from being violated due to device substitution in the video call.

Examples of a user interface screen output by at least one of the mobile device 101, the counterpart device 102, and the display device 103 based on the notification signal in order to prevent the privacy of User B from being violated are hereinafter described in detail with reference to FIGS. 14 and 16 to 19.

Figure 10:
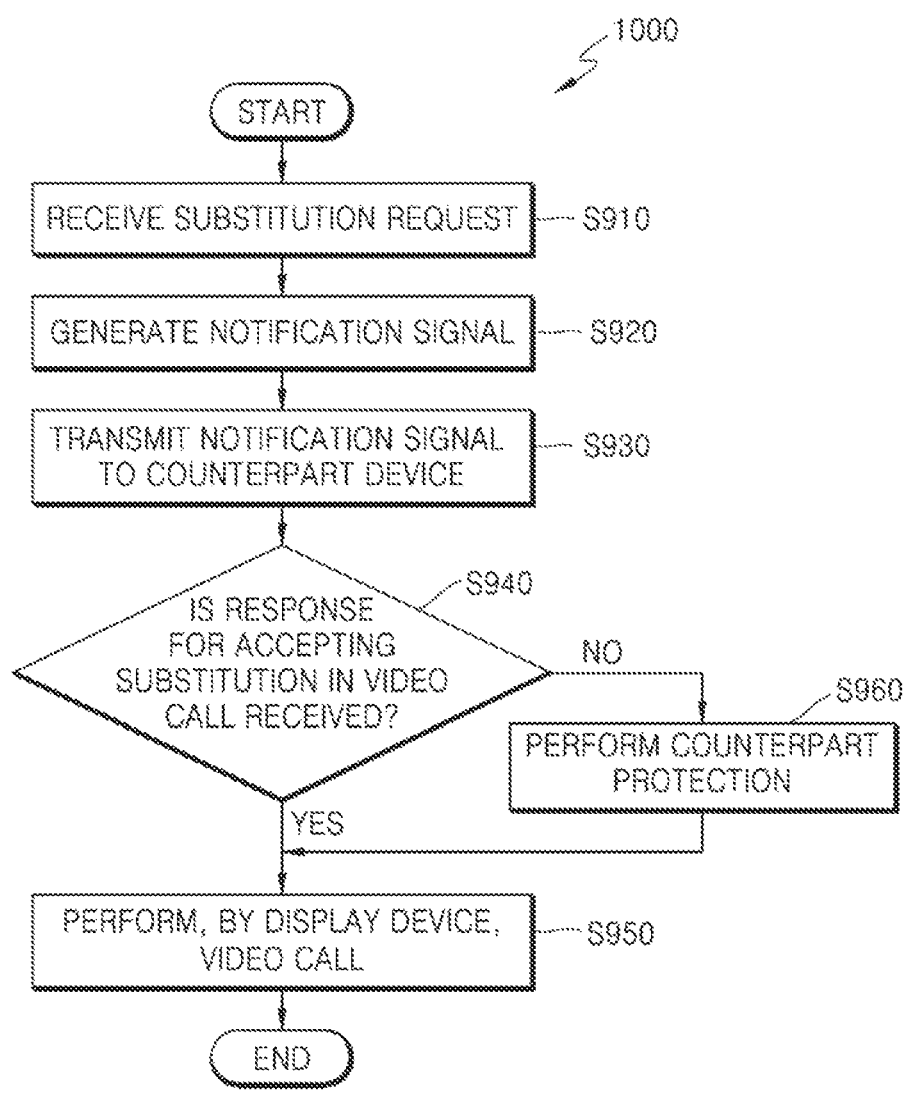
FIG. 10 is a flowchart illustrating the video call processing method of FIG. 9 in more detail.

FIG. 10 is a flowchart illustrating the video call processing method of FIG. 9 in more detail. In FIG. 10, the same operations as those of FIG. 9 are illustrated by using the same reference numerals, and thus detailed descriptions thereof are omitted. In addition, an example is described in which a video call processing method 1000 is performed by the display device 800 described above with reference to FIG. 8.

Referring to FIG. 10, the video call processing method 1000 may further include operations S940, S960, and S950, in addition to the operations of the video call processing method 900.

Referring to FIG. 10, the video call processing method 1000 may further include, subsequent to operation S930, determining whether a response for accepting the substitution request is received from the counterpart device 102 (S940). Operation S940 may be performed by the processor 710.

Referring back to FIG. 3, after outputting the notification information, the counterpart device 102 may detect an event indicating acceptance of device substitution (S240). In addition, when the event indicating acceptance of device substitution is detected, the counterpart device 102 may transmit, to at least one of the mobile device 101 and the display device 103, a response for accepting the substitution in the video call (hereinafter, referred to as an 'acceptance response'). For example, when the counterpart device 102 transmits, to the mobile device 101, the acceptance response, the mobile device 101 may then transmit, to the display device 800, the acceptance response. In addition, in transmitting the acceptance response, the communication relay by the server 500 described above with reference to FIG. 5 may be used. Here, an event that is detected by the counterpart device 102 and indicates acceptance of device substitution is described in detail below with reference to FIGS. 14 to 19.

Based on the determining in operation S940 that the acceptance response is received, the display device 800 may perform device substitution to perform the video call (S950). In detail, when the acceptance response is received, the processor 710 of the display device 800 may activate the camera 740 to obtain an image of User A and receive image data regarding User B. Accordingly, the display device 800 may perform the video call by displaying a video call screen including an image of User A and an image of User B through the display 720.

When it is determined in operation S940 that no acceptance response is received, the display device 800 may perform protection of User B, who is the user of the counterpart device 102. Here, the user of the counterpart device 102 may be referred to as a 'counterpart'.

In detail, counterpart protection may refer to operations for preventing an image of the counterpart (specifically, User B) from being provided to users other than User A of the mobile device 101 regardless of the intention of the counterpart (specifically, User B). In detail, an example of the counterpart protection may be that the display device 800 displays a video call screen that does not include an image of the counterpart (specifically, User B). Another example of the counterpart protection may be that the display device 800 includes, in a video call screen, an alternative image irrelevant to the counterpart (specifically, User B) instead of an image of the counterpart (specifically, User B), and displays the alternative image. Another example of the counterpart protection may be that the display device 800 displays a mute image in an area in which an image of the counterpart (specifically, User B) is to be displayed in the video call screen. Here, the mute image may include a white void image, or a black void image.

According to the video call processing method 1000 illustrated in FIG. 10, only when acceptance is received from the counterpart (specifically, User B) of the video call, who has not requested the device substitution in the video call, the display device 800 may display a video call screen including an image of the counterpart (specifically, User B). Accordingly, it is possible to prevent the privacy of the counterpart (specifically, User B) from being violated due to an image of the counterpart (specifically, User B) being viewed by a plurality of users of the display device 800 regardless of the intention of the counterpart (specifically, User B).

Figure 11:
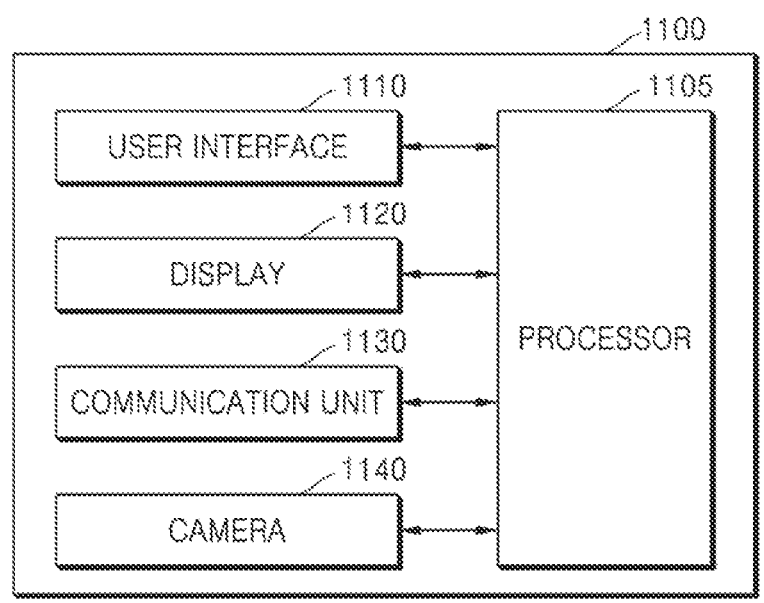
FIG. 11 is a block diagram illustrating a mobile device according to an embodiment of the present disclosure.

FIG. 11 is a block diagram illustrating a mobile device according to an embodiment of the present disclosure.

Referring to FIG. 11, a mobile device 1100 may represent a detailed structure of the mobile device 101 described above with reference to FIGS. 1 to 6.

In detail, the mobile device 1100 may represent a detailed structure of the counterpart device 102 described with reference to FIGS. 1 to 6. That is, the mobile device 1100 illustrated in FIG. 11 represents a mobile device capable of performing a video call, and may correspond to each of the mobile device 101 and the counterpart device 102 described with reference to FIGS. 1 to 6. Accordingly, in the mobile device 1100, the descriptions provided above with reference to FIGS. 1 to 6 are omitted.

Referring to FIG. 11, the mobile device 1100 includes a processor 1105, a user interface 1110, a display 1120, a communication unit 1130, and a camera 1140.

The processor 1105 performs at least one instruction to perform control such that an intended operation is performed. Here, the at least one instruction may be stored in an internal memory (not shown) included in the processor 1105 or a memory (not shown) included in the mobile device 1100 separately from the processor 1105.

In detail, the processor 1105 may perform the at least one instruction to control at least one component included in the mobile device 1100 such that the intended operation is performed. Therefore, although an example in which the processor 1105 performs certain operations is described, it may mean that the processor 1105 controls at least one component included in the mobile device 1100 to perform the operations.

The display 1120 outputs an image on the screen. In detail, the display 1120 may output an image corresponding to video data through a display panel (not shown) included therein so as to allow the user to visually recognize the video data. While a video call is performed, the display 1120 may display a video call screen under control by the processor 1105.

Also, the display 1120 may further include a touch pad (not shown) coupled to the display panel (not shown). When the display 1120 includes the display panel coupled to the touch pad, the display 1120 may output a user interface screen for receiving a touch input. In addition, when a user manipulation (e.g., a touch) corresponding to a certain command is detected through the user interface screen, the display 1120 may transmit, to the processor 1105, the detected touch input. Then, the processor 1105 may interpret the detected touch input to recognize and execute the certain command input by the user.

Hereinafter, an example is described in which the display 1120 includes the display panel (not shown) and the touch panel (not shown) coupled to each other.

The communication unit 1130 communicates with an external device (not shown) through at least one wired or wireless communication network.

In an embodiment of the present disclosure, during a video call mode in which a video call is performed, the processor 1105 may control the communication unit 1130 to access a server (not shown) for supporting a video call such that the video call is made between the mobile device 1100 and a counterpart device (not shown). Accordingly, the communication unit 1130 may transmit and receive data used for performing the video call.

Also, in an embodiment of the present disclosure, the communication unit 1130 may communicate with at least one of a mobile device and a display device (e.g., 103, 700, or 800) that are counterparts of a video call through a wired/wireless communication connection.

In detail, the communication unit 1130 may include at least one short-distance communication module (not shown) configured to perform communication according to a communication standard such as Bluetooth, Wi-Fi, BLE, NFC/RFID, Wi-Fi Direct, UWB, or Zigbee.

In addition, the communication unit 1130 may further include a long-range communication module (not shown) configured to perform communication with a server (not shown) for supporting long-range communication according to a long-range communication standard. In detail, the communication unit 1130 may include a long-range communication module (not shown) configured to perform communication through a network for Internet communication. Also, the communication unit 1130 may include a communication network conforming to a communication standard such as 3G, 4G, and/or 5G. In addition, the long-range communication module (not shown) may be referred to as a 'mobile communication module'.

For example, the communication unit 1130 may be connected to a server (not shown) for supporting a video call through a communication network conforming to a 5G communication standard. Accordingly, the mobile device 1100 may provide a video call service with a counterpart device (not shown).

The user interface 1110 may receive a user input for controlling the mobile device 1100. The user interface 1110 may include a user input device including a touch panel for detecting a touch of the user, a button for receiving a push operation of the user, a wheel for receiving a rotation operations of the user, a keyboard, a dome switch, etc., but is not limited thereto. In addition, the button, the wheel, and the dome switch may be implemented as keys corresponding to different functions, respectively.

In addition, the user interface 1110 may include a speech recognition device (not shown) for speech recognition. For example, the speech recognition device may be a microphone, and may receive a voice command or voice request of a user. Accordingly, the processor 1105 may control an operation corresponding to the voice command or voice request to be performed.

Also, the user interface 1110 may include a motion sensor (not shown). For example, the motion sensor (not shown)

may detect a motion of the user in a vehicle and receive the detected motion as a user input. Also, the speech recognition device (not shown) and the motion sensor (not shown) may not be included in the user interface 1110, but may be included in the mobile device 1100 as components or modules independent from the user interface 1110.

The camera 1140 may include an image sensor (not shown) to obtain an image frame, such as a still image or a moving image, through an image sensor in a video call mode or an image-capture mode.

Also, the camera 1140 may include at least one camera mounted at different positions. For example, the camera 1140 may include a front camera (not shown) and a rear camera (not shown). The front camera (not shown) may capture an image of the front of the mobile device 1100. The rear camera may have a field of view that is opposite to that of the front camera, and may capture an image of the rear of the mobile device 1100.

For example, when a video call is requested, the processor 1105 activates the camera 1140, specifically, the front camera (not shown). In addition, image data regarding the user may be obtained through the activated front camera (not shown).

Hereinafter, an example is described in which the mobile device 1100 corresponds to the counterpart device 102 described above with reference to FIGS. 1 to 6, and performs operations that are performed by the counterpart device 102. That is, because the mobile device 1100 corresponds to the counterpart device 102, the mobile device 1100 may perform a video call with the mobile device 101 remotely located from the mobile device 1100.

In an embodiment of the present disclosure, while performing a video call with a counterpart device (e.g., the mobile device 101 described above with reference to FIGS. 1 to 3), the processor 1105 of the mobile device 1100 receives a notification signal for notifying that the counterpart device (e.g., the mobile device 101 described above reference to FIGS. 1 to 3) is to be substituted with a display device (e.g., the display device 103 described above reference to FIGS. 1 to 3), and controls information corresponding to the notification signal to be output as visual or audible data. In addition, in response to the output of the information, the processor 1105 detects whether an event indicating acceptance of the device substitution in the video call occurs, and, based on a result of the detecting, determines whether to transmit, to the display device, image data regarding the user of the mobile device obtained through a camera of the mobile device.

Hereinafter, operations performed by the mobile device 1100 and examples of a user interface screen output by the mobile device 1100 are described in detail with reference to FIGS. 12 and 16.

Figure 12:
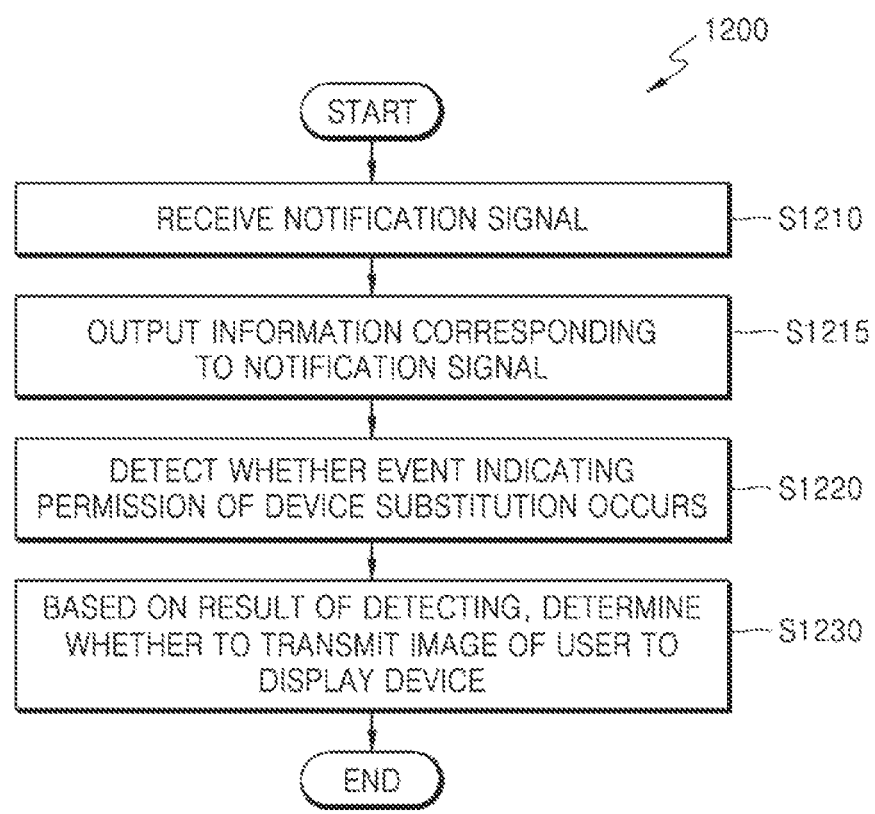
FIG. 12 is another flowchart illustrating a video call processing method according to an embodiment of the present disclosure.

FIG. 12 is another flowchart illustrating a video call processing method according to an embodiment of the present disclosure. FIG. 12 illustrates a video call processing method 1200 performed by the mobile device 1100 according to an embodiment of the present disclosure. Hereinafter, an example is described in which the video call processing method 1200 is performed by the mobile device 1100 described above with reference to FIG. 11.

In the embodiments illustrated in FIGS. 11 and 12, an example is described in which the mobile device 1100 performing the video call processing method 1200 corresponds to the counterpart device 102 described above with reference to FIGS. 1 to 6. Therefore, the video call processing method 1200 may represent the flow of operations performed by the counterpart device 102 described above with reference to FIGS. 1 to 6. In addition, when describing a video call from the perspective of the mobile device 1100, a counterpart device performing the video call with the mobile device 1100 corresponds to the mobile device 101 described above with reference to FIGS. 1 to 6.

In the video call processing method 1200, the mobile device 1100 performing the video call with the counterpart device (e.g., the mobile device 101 described above with reference to FIGS. 1 to 3) receives a notification signal for notifying that the counterpart device (e.g., the mobile device 101 described above with reference to FIGS. 1 to 6) is to be substituted with the display device (e.g., the display device 103 described above with reference to FIGS. 1 to 6) (S1210). Operation S1210 may correspond to operation S225 described above with reference to FIG. 3. In addition, operations corresponding to operation S1210 may be performed by the communication unit 1130 under control by the processor 1105. In detail, the mobile device 1100 may receive the notification signal from the display device (e.g., the display device 103 described above with reference to FIGS. 1 to 6), the counterpart device (e.g., the mobile device 101 described above with reference to FIGS. 1 to 6), or a server performing communication relay (e.g., the server 500 illustrated in FIG. 5).

Then, in the video call processing method 1200, information corresponding to the notification signal received in operation S1210 may be output (S1215). Operation S1215 may correspond to operation S230 described above with reference to FIG. 3. In addition, operations corresponding to operation S1215 may be performed under control by the processor 1105.

In detail, under control by the processor 1105, the information corresponding to the notification signal (hereinafter, referred to as 'first information') is output as information that is visually or aurally recognizable by the user. For example, under control by the processor 1105, the display 1120 may output a user interface screen including the first information. Alternatively, under control by the processor 1105, the display 1120 may display the first information in the form of a pop-up window, an icon, a marker, a text message, an on-screen display (OSD), or the like, on a screen on which the first information is currently output. Alternatively, under control by the processor 1105, the first information may be output in the form of an audio signal that is audibly recognizable by the user, through a speaker (not shown) included in the mobile device 1100. Here, the speaker (not shown) may be included in the mobile device 1100 or may be externally connected to the mobile device 1100.

Then, in the video call processing method 1200, in response to the first information being output in operation S1210, it may be detected whether an event indicating permission (or acceptance) of the device substitution in the video call occurs (S1220). Operation S1220 may correspond to operation S240 described above with reference to FIG. 3. In addition, operations corresponding to operation S1220 may be performed under control by the processor 1105.

In detail, whether a first event occurs or is detected may be determined based on whether the first event occurs within a preset period of time after the first information is output.

In addition, the event indicating permission of the device substitution in the video call (i.e., the 'first event') may mean that a user input is received indicating that the user of the mobile device 1100 wants to continue the video call after the device substitution is performed. For example, the event may be a user input for selecting the 'Yes' key 422 described above with reference to FIG. 4. In relation to the first event, the descriptions provided above with reference to FIG. 4 are omitted.

In addition, when a user input for rejecting the device substitution in the video call is not received before a preset offset period of time (e.g., 5 seconds or 10 seconds) has elapsed after the first information is output, the processor 1105 may determine or identify that the first event exists (or occurs). Here, examples of the user input for rejecting the device substitution in the video call may include a user input for switching the video call to a voice call, a user input for requesting that an alternative image be included in a video call screen instead of an image of the user of the mobile device 1100, and a user input for requesting termination of the video call. Here, the alternative image may be an image other than an image of the user of the mobile device 1100. For example, the alternative image may be an image that does not include the user of the mobile device 1100. As another example, the alternative image may be an image that does not include a space in which the user of the mobile device 1100 and the user of the mobile device 1100 are located. As another example, the alternative image may be an image including a preset picture, famous painting, content, icon, or the like.

Based on a result of the detecting (or determining) in operation S1220, it may be determined whether to transmit, to the display device (e.g., the display device 103 described above with reference to FIGS. 1 to 6), image data regarding the user of the mobile device 1100 (e.g., User B described above with reference to FIG. 2) obtained through the camera 1140 of the mobile device 1100 (S1230). Operations corresponding to operation S1230 may be performed by the processor 1105. Operations corresponding to operation S1230 are described in detail below with reference to FIGS. 13 to 19.

Figure 13:
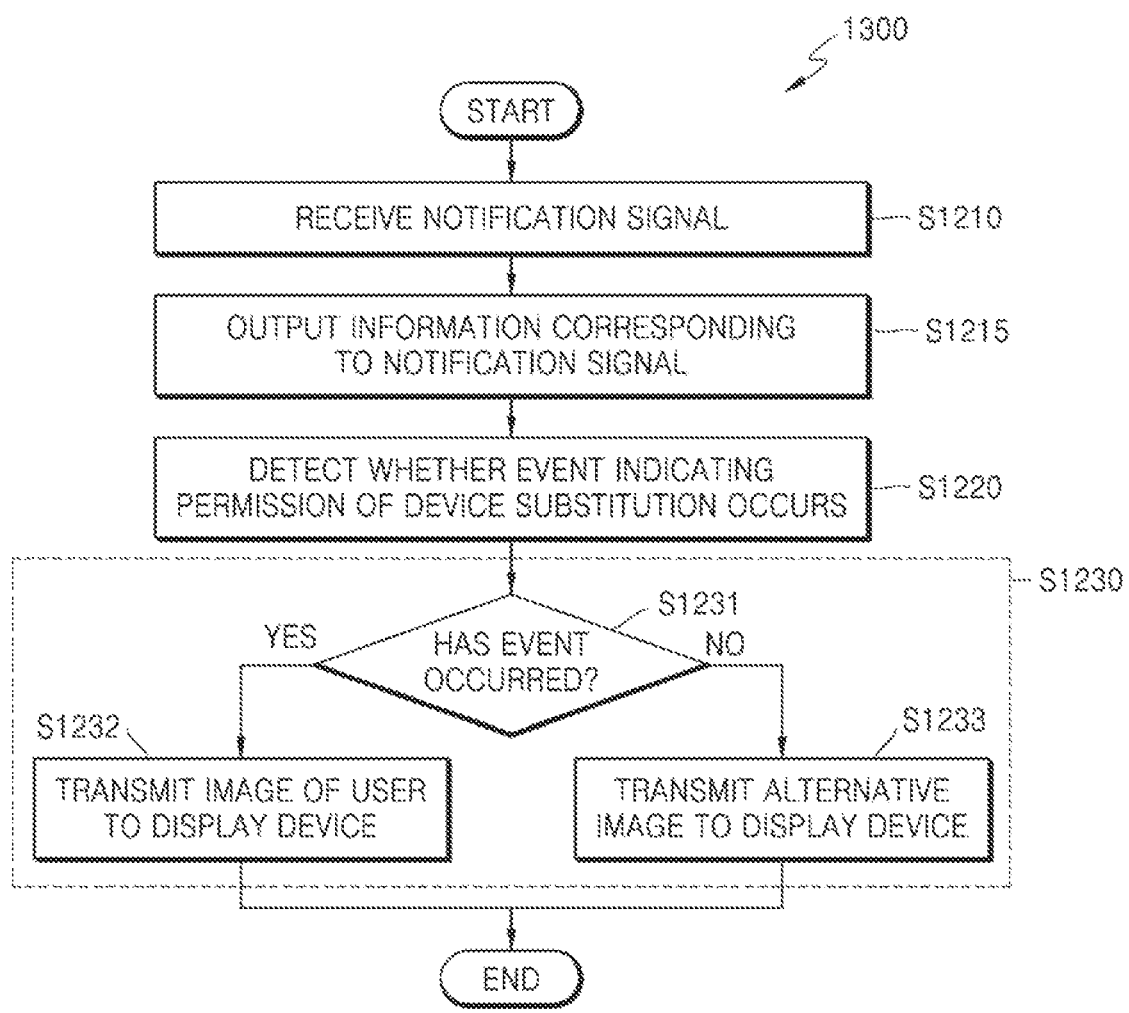
FIG. 13 is a flowchart illustrating the video call processing method of FIG. 12 in more detail.

FIG. 13 is a flowchart illustrating the video call processing method of FIG. 12 in more detail. In FIG. 13, the same operations as those of FIG. 12 are illustrated by using the same reference numerals, and thus redundant descriptions thereof are omitted. In addition, hereinafter, an example is described in which a video call processing method 1300 is performed by the mobile device 1100 described above with reference to FIG. 11.

Referring to FIG. 13, operation S1230 described above with reference to FIG. 12 may include operations S1231, S1232, and S1233.

Referring to FIG. 13, in the video call processing method 1300, it may be determined whether an event indicating permission of device substitution in a video call (i.e., a 'first event') has occurred (or detected) (S1231).

When it is determined in operation S1231 that the first event is detected, the mobile device 1100 may transmit, to the display device (e.g., the mobile device 101 described above with reference to FIGS. 1 to 6), an image (the above-described 'second image') for the user (the above-described 'second user') of the mobile device 1100 (S1232). In addition, operations corresponding to operation S1231 may be performed by the communication unit 1130 under control by the processor 1105.

In detail, when the first event occurs or is detected, it may be determined that the user of the mobile device 1100 (the above-described 'second user') has permitted the second image, which is the image of the user, to be viewed by at least one user (e.g., User A1 231, User A2 232, and/or User A3 233) of the device-substituting display device (e.g., the display device 103 described above with reference to FIGS. 1 to 6)). Accordingly, the mobile device 1100 may transmit the second image to the display device (e.g., the display device 103 described above with reference to FIGS. 1 to 6), such that a video call screen including the second image is displayed on the display device (e.g., the display device 103 described above with reference to FIGS. 1 to 6).

When it is determined in operation S1231 that the first event is not detected, the mobile device 1100 may not transmit the second image to the display device (S1233). In detail, when it is determined in operation S1231 that the first event is not detected, the mobile device 1100 may not transmit the second image to the display device but may transmit an alternative image to the display device (S1233). Here, operations corresponding to operation S1231 may be performed by the communication unit 1130 under control by the processor 1105.

In addition, when it is determined in operation S1231 that the first event is not detected, the mobile device 1100 may not transmit the second image to the display device but may transmit, to the display device, a request to display an alternative image (S1233). In this case, the mobile device 1100 does not need to transmit the alternative image to the display device, and the display device may control a video call screen including an alternative image stored in the display device to be output on the display device, based on the received request.

Hereinafter, an embodiment of operation S1230 is described in detail with reference to FIG. 14.

Figure 14:
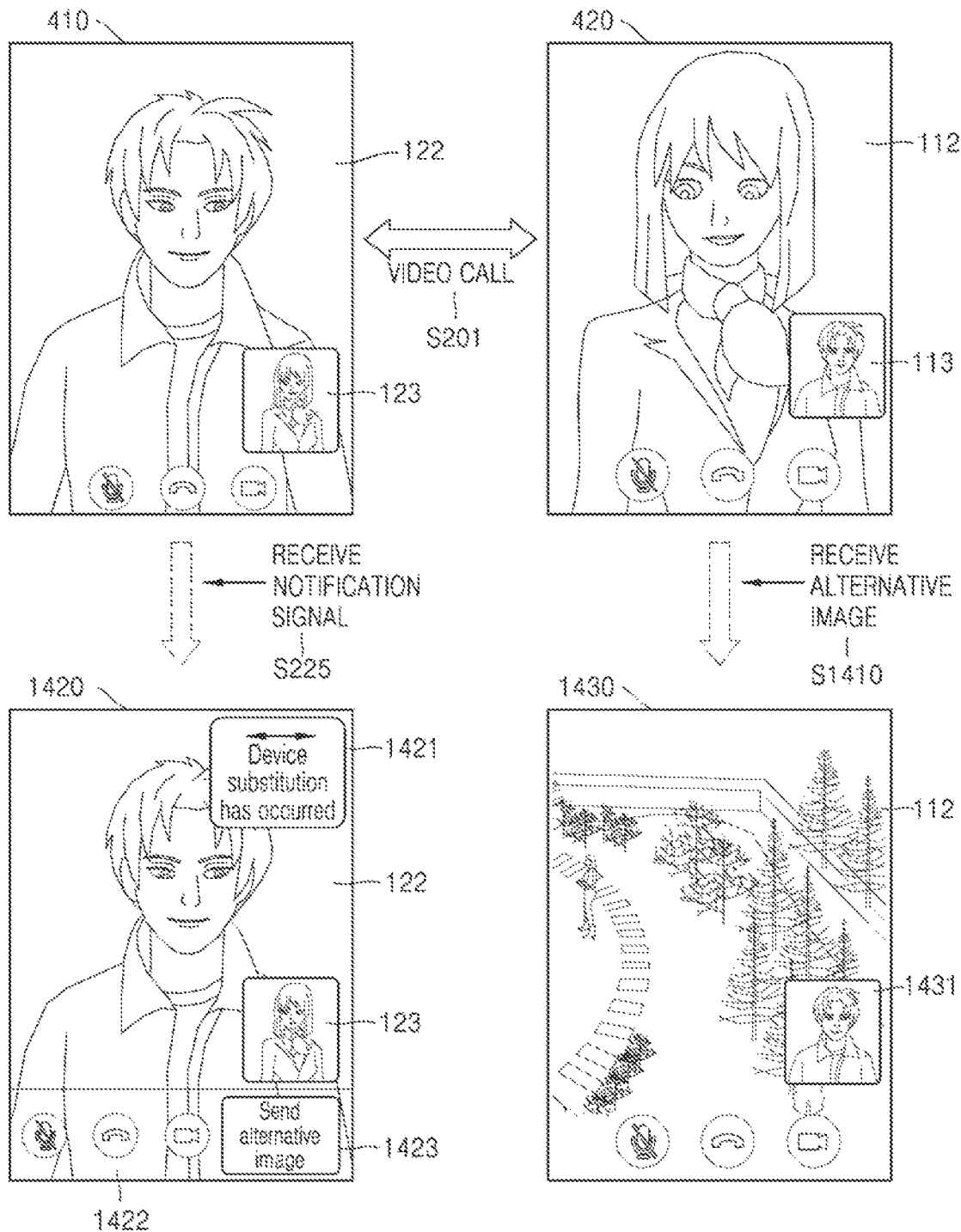
FIG. 14 is another diagram for describing operations performed in a video call processing method according to an embodiment of the present disclosure.

FIG. 14 is another diagram for describing operations performed in a video call processing method according to an embodiment of the present disclosure. In FIG. 14, the same elements as those of FIG. 4 are illustrated by using the same reference numerals. Accordingly, in describing the embodiment illustrated in FIG. 14, the descriptions provided above with reference to FIG. 4 are omitted.

Referring to FIG. 14, when a notification signal is received (specifically, operation S225 of FIG. 3, or operation S1210 of FIG. 13), the mobile device 1100 (or the counterpart device 102 described above with reference to FIGS. 1 to 6) may switch from the screen 410 being displayed to a screen 1420.

In detail, the mobile device 1100 may output first information in response to the notification signal being received (S1215). In detail, the first information is information corresponding to the notification signal, and may be a pop-up window, an icon, a marker, a text message, or an OSD indicating that device substitution for a video call has occurred. Referring to the screen 1420 of FIG. 14, an example is illustrated in which the first information is output in the form of an icon 1421 indicating that device substitution has occurred.

Also, in response to the notification signal being received, the processor 1105 of the mobile device 1100 may perform control to output a menu key 1423 for transmitting an alternative image without accepting the device substitution. Here, the menu key 1423 may be added to an existing menu bar 1422 (e.g., may correspond to the menu bar 124 described above with reference to FIG. 1) for controlling the video call.

The user of the mobile device 1100 may select the menu key 1423 if he/she does not want the user of the display device (e.g., the display device 103 described above with reference to FIGS. 1 to 6) to view his/her image (specifically, a second image). Then, the processor 1105 of the mobile device 1100 may not transmit the second image to the display device (S1233).

Based on a user input being received through the user interface 1110, the processor 1105 of the mobile device 1100 may transmit, to the display device, an alternative image or a request to output an alternative image.

Accordingly, the display device (e.g., the display device 103 described above with reference to FIGS. 1 to 6) may receive the alternative image or the request (S1410), and output a screen 1430 according thereto. In detail, the screen 1430 may be a video call screen including an alternative image instead of the second image that is an image for the second user.

Figure 15:
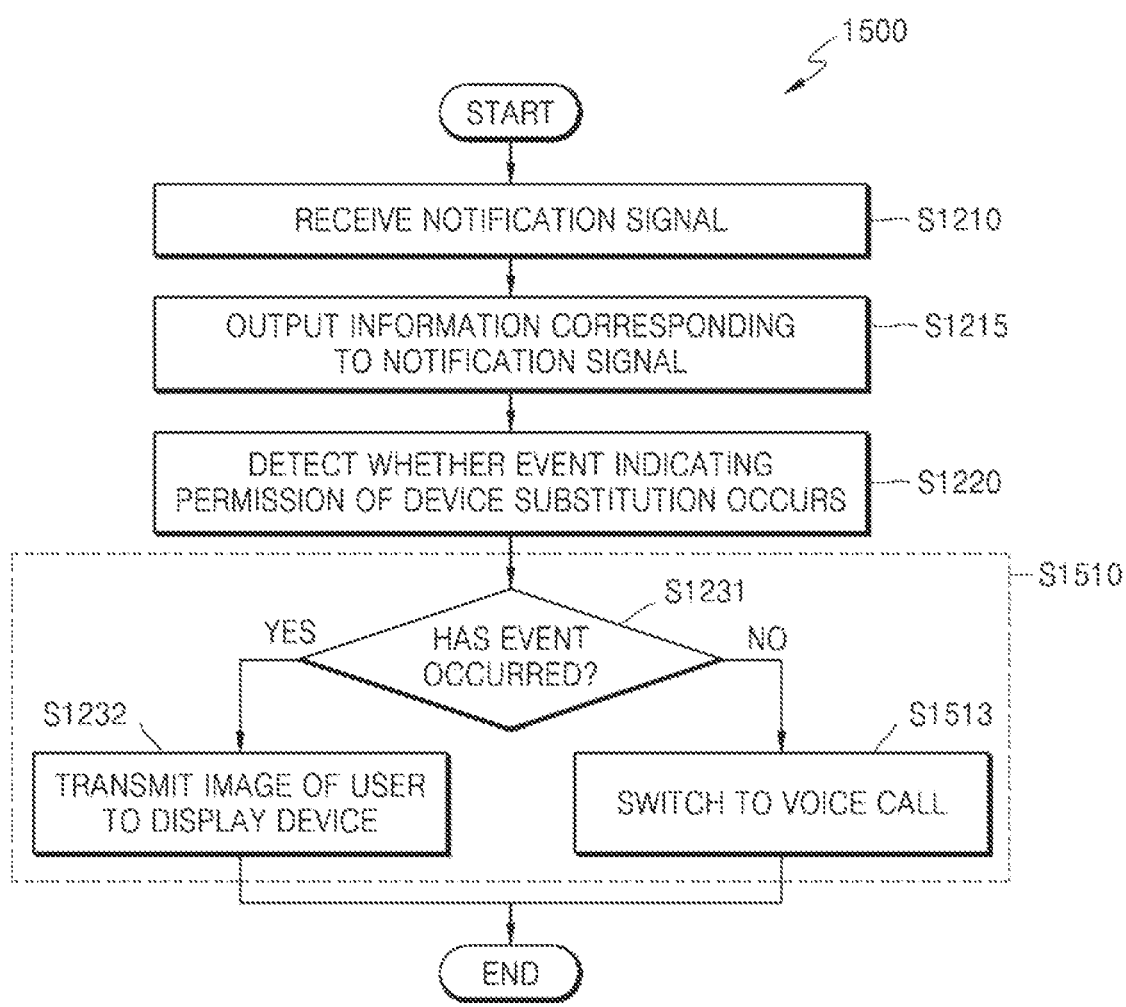
FIG. 15 is another flowchart illustrating the video call processing method of FIG. 12 in more detail.

FIG. 15 is another flowchart illustrating the video call processing method of FIG. 12 in more detail. FIG. 15 is a flowchart illustrating the video call processing method of FIG. 12 in more detail. In FIG. 15, the same operations as those of FIGS. 12 and 13 are illustrated by using the same reference numerals, and thus redundant descriptions thereof are omitted. In addition, hereinafter, an example is described in which a video call processing method 1500 is performed by the mobile device 1100 described above with reference to FIG. 11.

In the video call processing method 1500 illustrated in FIG. 15, the first event detected in operation S1231 may be a user input for requesting to switching the ongoing video call to a voice call. In detail, the processor 1105 of the mobile device 1100 may recognize whether the above-described user input is received through the user interface 1110.

Referring to FIG. 15, when it is determined in operation S1231 that the first event is not detected, the mobile device 1100 may switch the ongoing video call to a voice call (S1513). Accordingly, the mobile device 1100 does not transmit the second image to the display device. Operations corresponding to operation S1513 are described in detail below with reference to FIG. 16.

Figure 16:
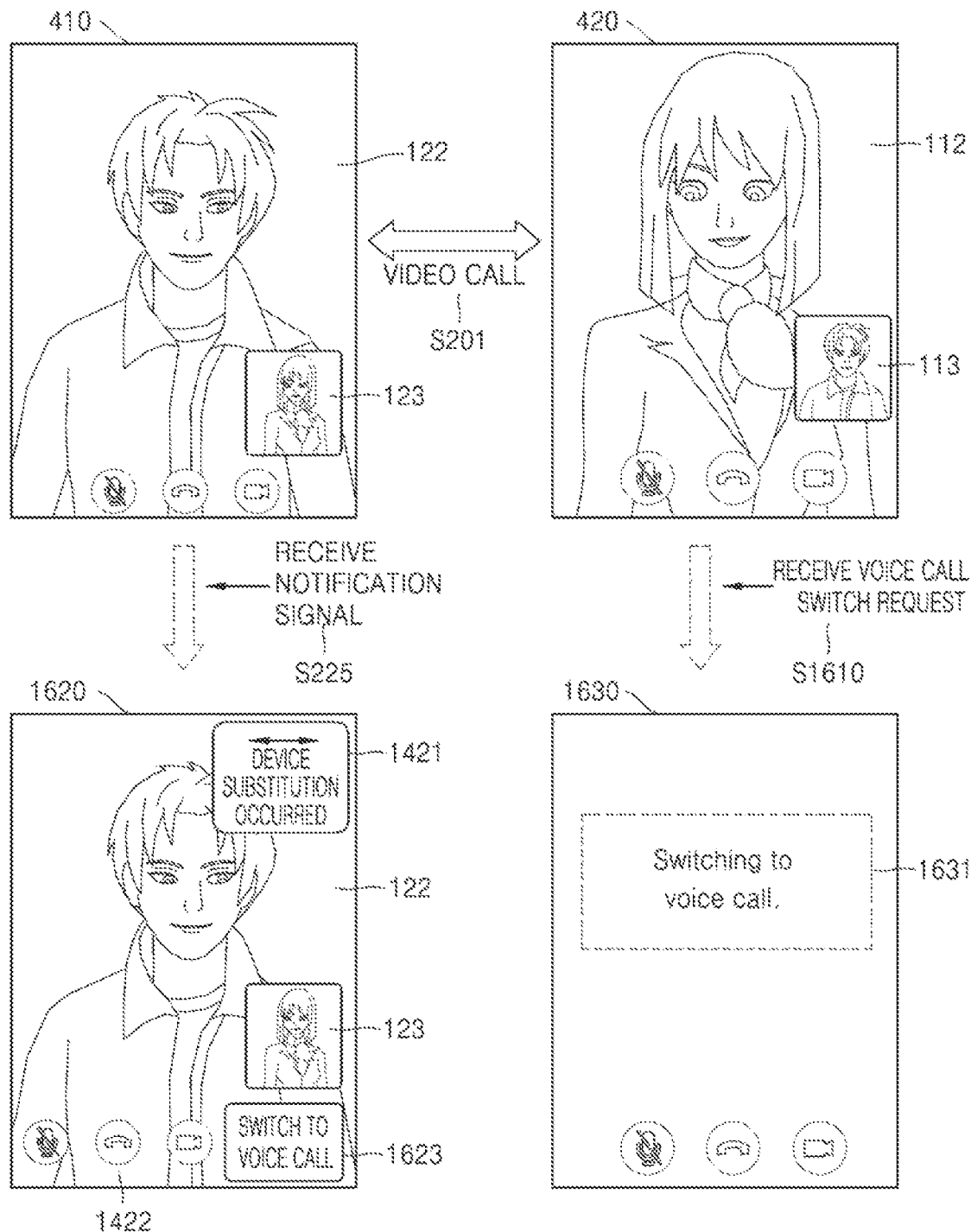
FIG. 16 is another diagram for describing operations performed in a video call processing method according to an embodiment of the present disclosure.

FIG. 16 is another diagram for describing operations performed in a video call processing method according to an embodiment of the present disclosure. In FIG. 16, the same elements as those of FIG. 14 are illustrated by using the same reference numerals. Accordingly, in describing the embodiment illustrated in FIG. 16, the descriptions provided above with reference to FIG. 14 are omitted.

Referring to FIG. 16, when a notification signal is received (specifically, operation S225 of FIG. 3, or operation S1210 of FIG. 13), the mobile device 1100 (or the counterpart device 102 described above with reference to FIGS. 1 to 6) may switch from the screen 410 being displayed to a screen 1620.

Then, the mobile device 1100 may output first information in response to the notification signal being received (S1215). In detail, the first information is information corresponding to the notification signal, and may be a pop-up window, an icon, a marker, a text message, or an OSD indicating that device substitution for a video call has occurred. Referring to the screen 1620 of FIG. 16, an example is illustrated in which the first information is output in the form of an icon 1421 indicating that device substitution has occurred.

Also, in response to the notification signal being received, the processor 1105 of the mobile device 1100 may perform control to output a menu key 1623 for requesting to switch the ongoing video call to a voice call. Here, the menu key 1623 may be added to the existing menu bar 1422 (e.g., may correspond to the menu bar 124 described above with reference to FIG. 1) for controlling the video call.

The user of the mobile device 1100 may select the menu key 1423 if he/she does not want the user of the display device (e.g., the display device 103 described above with reference to FIGS. 1 to 6) to view his/her image (specifically, a second image) but wants to maintain the call. Then, the processor 1105 of the mobile device 1100 may transmit, to the display device, a voice call switch request corresponding to the user input.

Accordingly, the display device (e.g., the display device 103 described above with reference to FIGS. 1 to 6) may receive the voice call switch request (S1610), and output a screen 1630 according thereto. In detail, the screen 1630 may be a user interface screen including a message 1631 informing of switching to a voice call. In this case, the screen 1630 does not include a video call screen.

Hereinafter, with reference to FIGS. 17 to 19, examples of screens, which are respectively output by the mobile device 101, the counterpart device 102, and the display device 103 as the video call processing method according to an embodiment of the present disclosure is performed, are described in detail.

Figure 17:
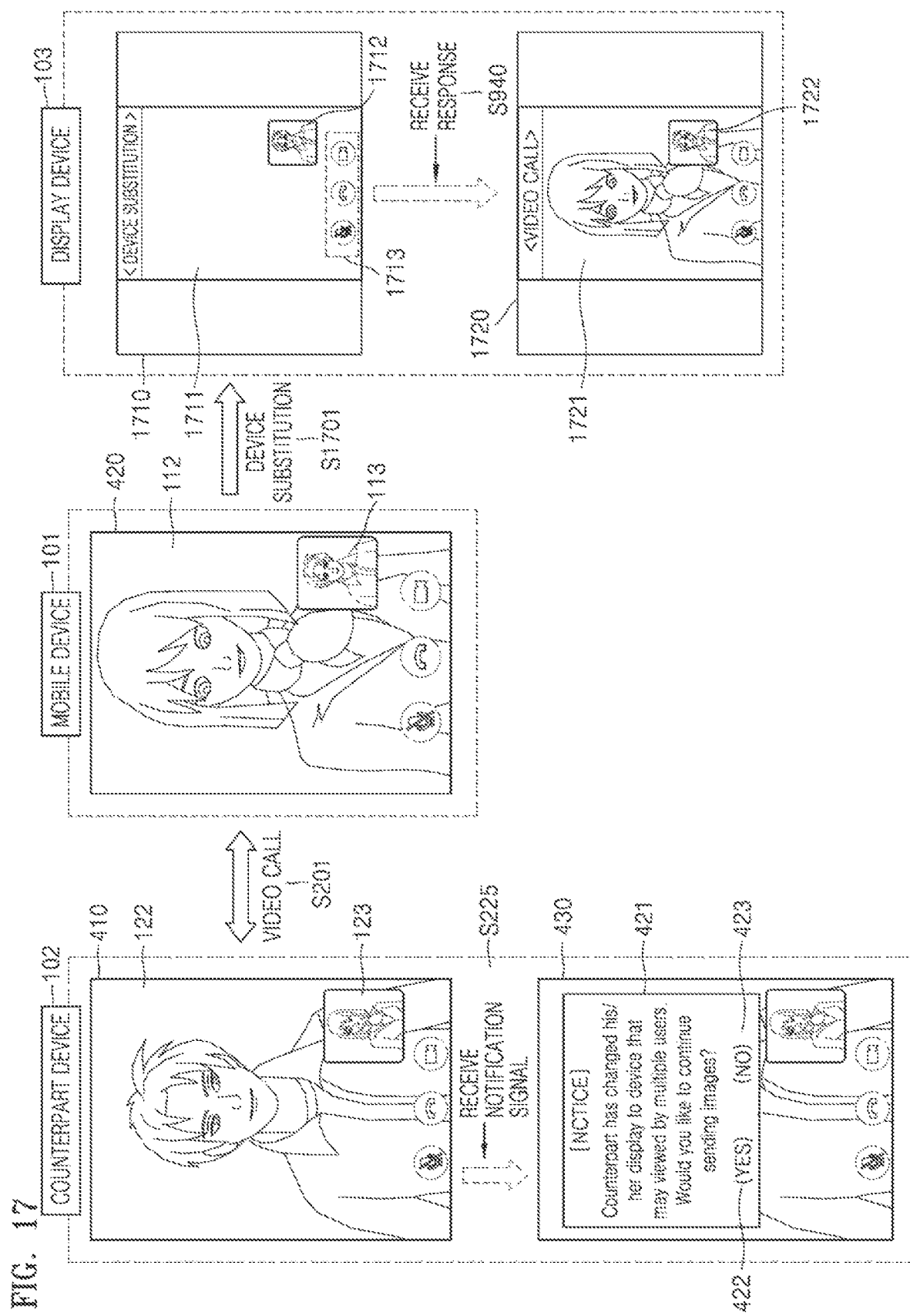
FIG. 17 is another diagram for describing operations performed in a video call processing method according to an embodiment of the present disclosure.

FIG. 17 is another diagram for describing operations performed in a video call processing method according to an embodiment of the present disclosure. In FIG. 17, the same elements as those of FIG. 4 are illustrated by using the same reference numerals. Accordingly, in describing the embodiment illustrated in FIG. 17, the descriptions provided above with reference to FIG. 4 are omitted.

FIG. 17 illustrates screens that are output by the display device 103, in addition to the elements illustrated in FIG. 4.

In an embodiment of the present disclosure, when a device substitution request is received (S1701), the display device 103 may activate a camera (specifically, 740 illustrated in FIG. 8) included in the display device 103 based on the received substitution request, and output a video call screen 1710 including a first image 1712 obtained by the camera. Here, operation S1701 corresponds to operation S207 described above with reference to FIG. 3 and operation S910 described above with reference to FIGS. 9 and 10, and thus redundant descriptions thereof are omitted.

Referring to FIG. 17, the display device 103 may activate the camera to obtain an image of User A, who is the user of the display device 103 and the mobile device 101, based on the device substitution request received in operation S1701. In detail, the camera (specifically, 740 illustrated in FIG. 8), which is activated under control by the processor (specifically, 710 illustrated in FIG. 8) of the display device 103, may obtain a first image that is an image of User A by performing image capture according to a video call mode. In addition, the processor (specifically, 710 illustrated in FIG. 8) of the display device 103 may control the video call screen 1710 including the first image 1712 obtained by the camera (specifically, 740 illustrated in FIG. 8) to be output. Here, the video call screen 1710 includes only the first image 1712 and does not include any image of User B. In detail, the video call screen 1710, which is output until a response corresponding to the notification signal is received from the counterpart device 102, includes only the first image 1712 and does not include any image of User B.

In detail, in the video call screen 1710, a mute image 1711, instead of an image of User B, may be included in a main screen, and the first image 1712 may be included in a subscreen.

Then, when a response corresponding to the notification signal is received from the counterpart device (in detail, when it is determined in operation S940 of FIG. 10 that a response is received), the display device 103 may output a video call screen 1720 including a first image 1722 and a second image 1721 of User B, which is obtained by and transmitted from the counterpart device 102.

In detail, that the counterpart device 102 transmits the response corresponding to the notification signal means that the counterpart device 102 is to continue performing the video call still after device substitution is performed, the counterpart device 102 may perform control such that the display device 103 receives image data regarding User B obtained and then transmitted by the counterpart device 102. When device substitution in the video call is performed, the video call that was performed by the mobile device 101 is performed by the display device 103, and thus the counterpart device 102 may transmit image data regarding User B directly to the display device 103. Alternatively, the counterpart device 102 may transmit the image data regarding User B, to the mobile device 101 or a server (e.g., the server 500 described above with reference to FIG. 5), and the mobile device 101 or the server (e.g., the server 500 described above with reference to FIG. 5) may then transmit the image data to the display device 103.

Accordingly, when the response corresponding to the notification signal is received, the display device 103 may receive the image data regarding User B, simultaneously with or subsequently to the reception. Then, the display device 103 may generate a second image based on the received image data regarding User B and include the second image in the video call screen 1720.

Figure 18:
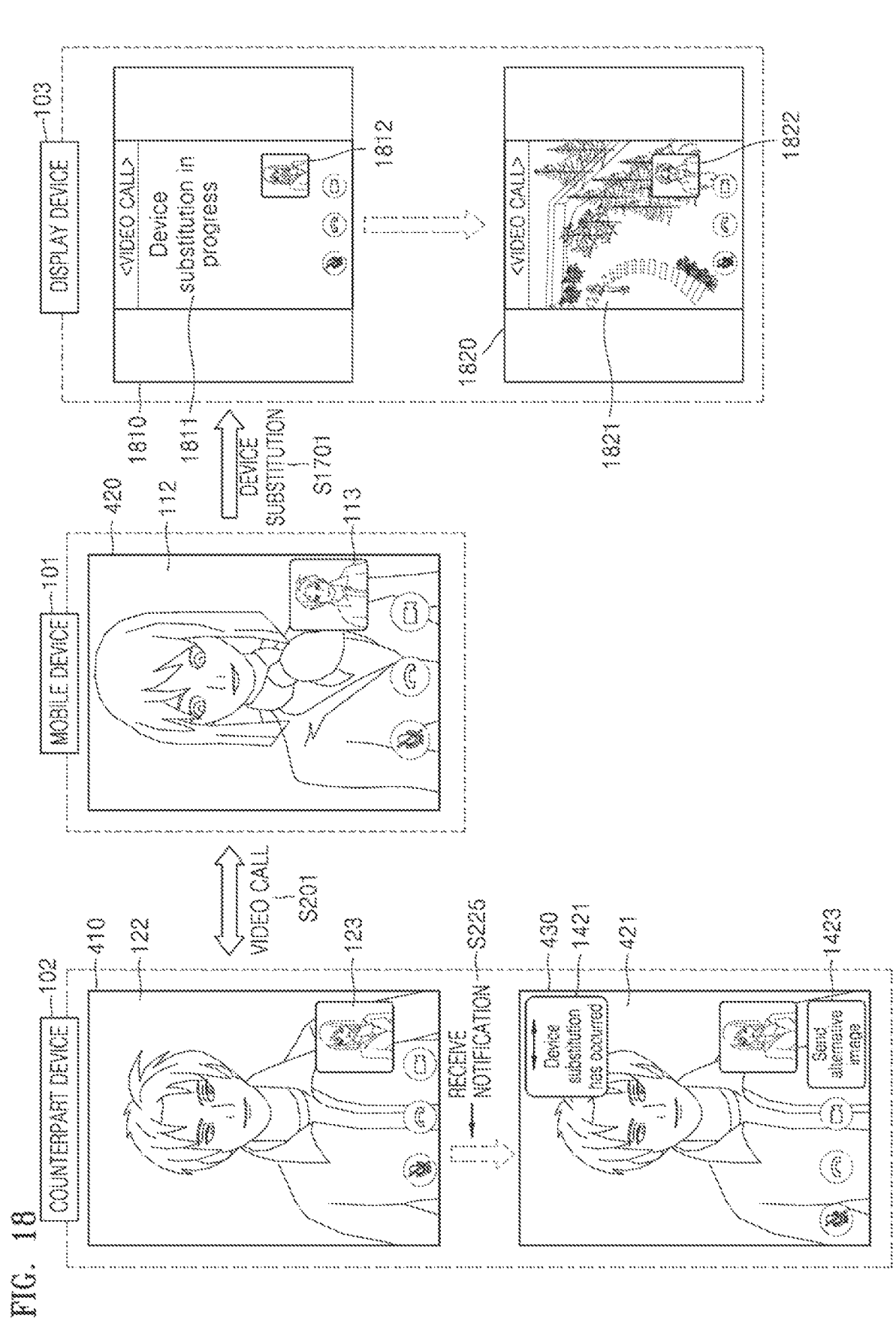
FIG. 18 is another diagram for describing operations performed in a video call processing method according to an embodiment of the present disclosure.

FIG. 18 is another diagram for describing operations performed in a video call processing method according to an embodiment of the present disclosure. In FIG. 18, the same elements as those of FIGS. 14 and 17 are illustrated by using the same reference numerals. Accordingly, in describing the embodiment illustrated in FIG. 18, the descriptions provided above with reference to FIGS. 14 and 17 are omitted.

In an embodiment of the present disclosure, when a device substitution request is received (S1701), the display device 103 may activate a camera (specifically, 740 illustrated in FIG. 8) included in the display device 103 based on the received substitution request, and output a video call screen 1810 including a first image 1812 obtained by the camera.

In addition, until the display device 103 receives, from the counterpart device 102, a response corresponding to the notification signal, the video call screen 1810 includes only the first image 1812 and does not include any image of User B. In detail, the video call screen 1810 may include, instead of an image of User B, a message 1811 indicating that device substitution is being performing, and may include the first image 1812 on a subscreen.

In addition, when a request signal corresponding to a menu key (specifically, 1423 of FIG. 14) for transmitting an alternative image is received from the counterpart device 102, the display device 103 may output a video call screen 1820 including a first image 1822 and an alternative image 1821.

Figure 19:
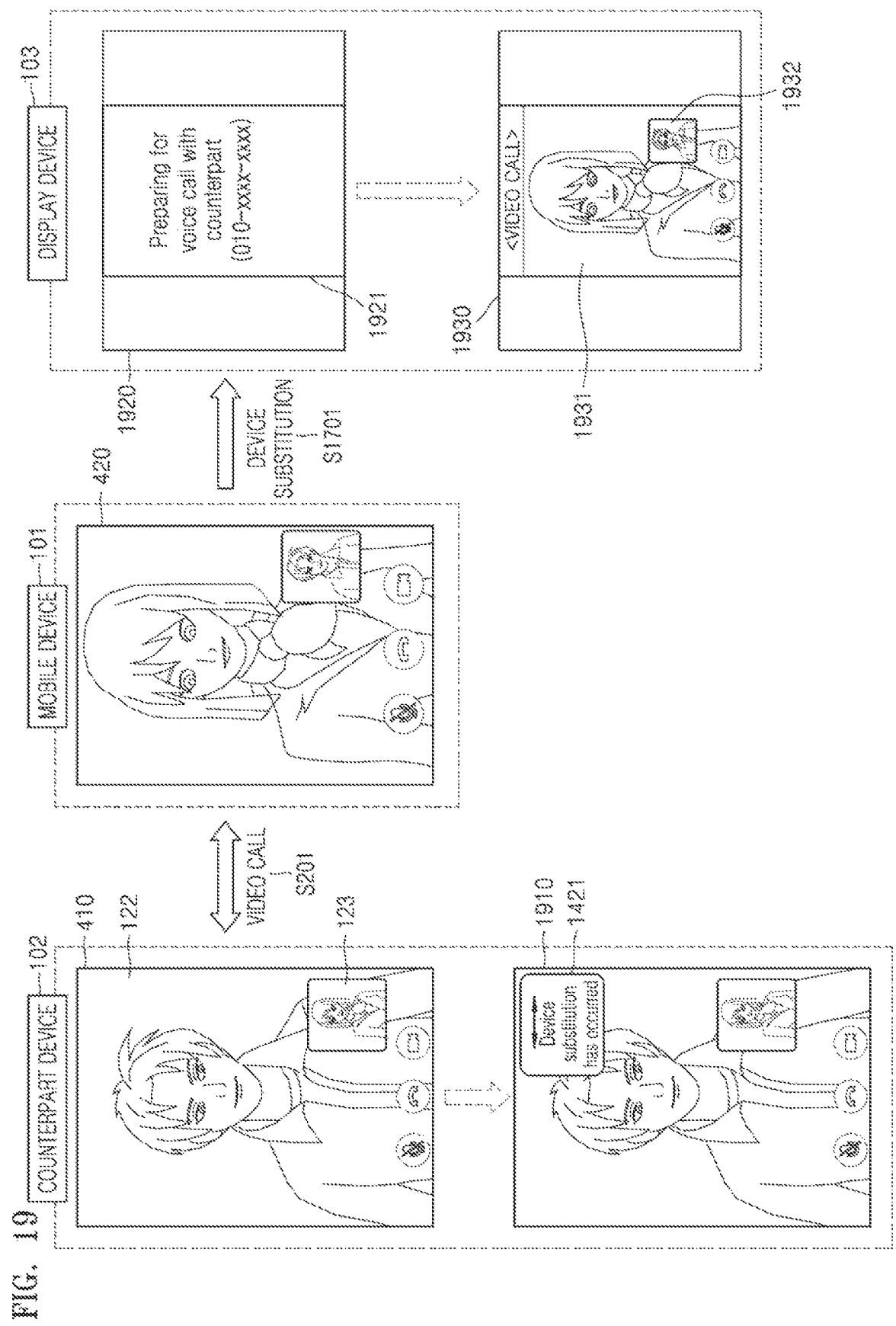
FIG. 19 is another diagram for describing operations performed in a video call processing method according to an embodiment of the present disclosure.

FIG. 19 is another diagram for describing operations performed in a video call processing method according to an embodiment of the present disclosure. In FIG. 19, the same elements as those of FIGS. 14 and 17 are illustrated by using the same reference numerals. Accordingly, in describing the embodiment illustrated in FIG. 19, the descriptions provided above with reference to FIGS. 14 and 17 are omitted.

Referring to FIG. 19, when a device substitution request is received (S1701), the display device 103 may output, on a screen 1920, a message 1921 informing of preparation for a video call. In detail, the message 1921 informing of the preparation of the video call may be output by the display device 103 until an offset period of time has elapsed after the notification signal is transmitted to the counterpart device 102.

When the offset period of time has elapsed after the notification signal is transmitted, the display device 103 may perform the video call. In detail, when the first event is not detected but a user input for rejecting device substitution in the video call is also not received, the counterpart device 102 may determine that the user of the counterpart device 102 has implicitly accepted or permitted device substitution in the video call. In this case, the counterpart device 102 may not transmit any signal to the display device 103, for example, a signal for notifying of detection of the first event, and a signal for notifying of rejection of device substitution. In addition, when the counterpart device 102 determines that device substitution is implicitly accepted or permitted, image data regarding User B may be transmitted to the display device 103 or the mobile device 101.

In addition, when a certain offset period of time has elapsed after the notification signal is transmitted (S225), the display device 103 may determine that the user of the counterpart device 102 does not reject device substitution, and perform the video call. Accordingly, the display device 103 may display a video call screen 1930 including a second image 1931 that is an image of User B, and a first image 1932 that is an image of User A. That is, the display device 103 outputs the video call screen 1930 corresponding to the video call screen 420 that was previously output by the mobile device 101, and thus continuously performs the video call.

Figure 20:
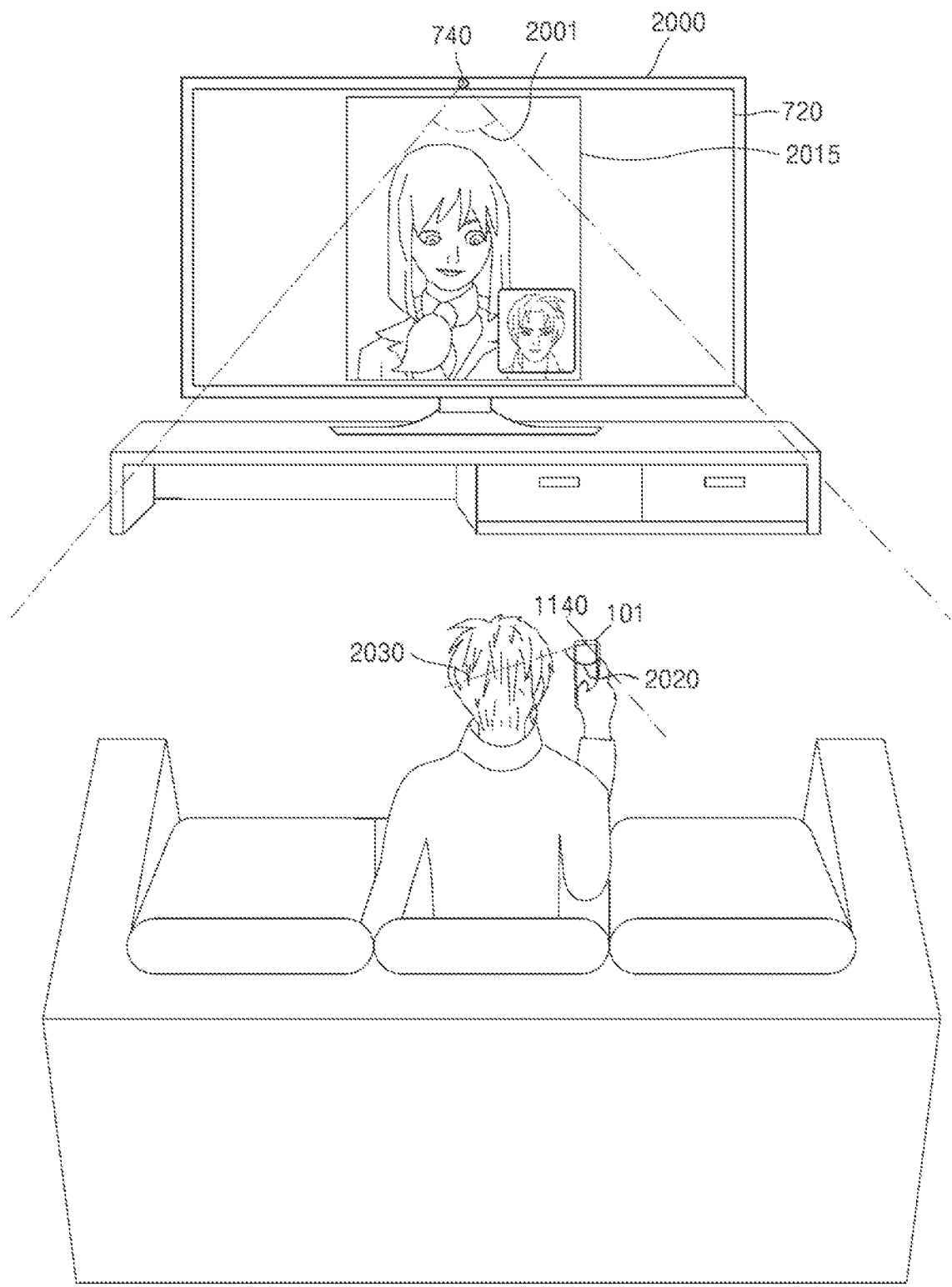
FIG. 20 is another diagram illustrating a display device that is connected, through a communication network, to one of two mobile devices that are performing a video call with each other.

FIG. 20 is another diagram illustrating a display device that is connected, through a communication network, to one of two mobile devices that are performing a video call with each other.

Figure 21:
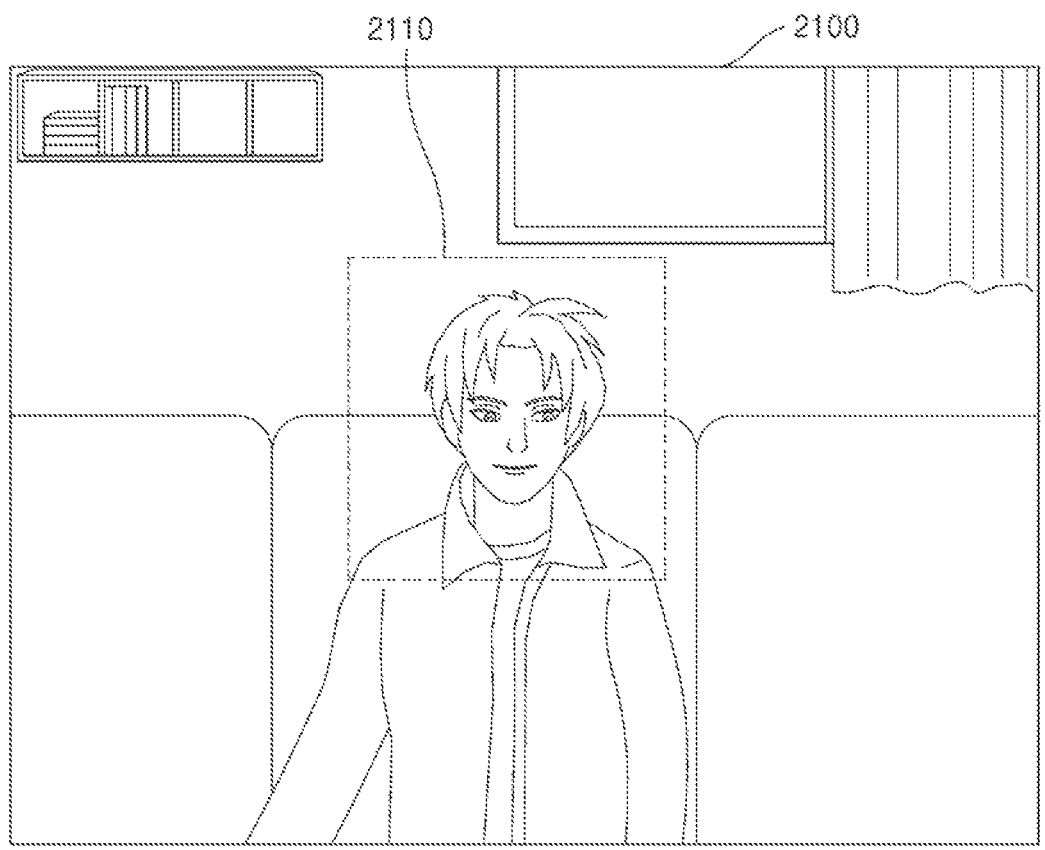
FIG. 21 is a diagram illustrating an image obtained through a camera of the display device illustrated in FIG. 20.

FIG. 21 is a diagram illustrating an image obtained through a camera of the display device illustrated in FIG. 20.

A display device 2000 illustrated in FIG. 20 may correspond to the display device 103, 700, or 800 according to an embodiment of the present disclosure described above with reference to FIGS. 1 to 19. Also, the mobile device 101 illustrated in FIG. 20 may correspond to the mobile device 101 or 1100 according to an embodiment of the present disclosure described with reference to FIGS. 1 to 19. In addition, a user 2030 may correspond to User A 117 described above with reference to FIGS. 1 and 2, and hereinafter, the user 2030 is referred to as User A 2030. In addition, in FIGS. 1 to 20, the same elements are illustrated by using the same reference numerals.

Accordingly, in describing the embodiment illustrated in FIG. 20, the descriptions provided above with reference to FIGS. 14 and 19 are omitted.

As described above, when device substitution in a video call is performed, the video call having been performed by the mobile device 101 is handed over to the display device 2000. In detail, before the device substitution in the video call is made, the camera 1140 of the mobile device 101 obtains an image of User A 2030. In addition, after the device substitution in the video call is made, the camera 740 of the display device 2000 obtains an image of User A 2030. In addition, when the device substitution in the video call is performed, a video call screen 2015 may be output on the display 720 of the display device 2000.

Here, the camera 740 may be arranged on the front surface of the display device 2000 to obtain a first image that is an image of User A 2030 facing the front of the display device 2000.

In general, the distance between the display device 2000 and User A 2030 is greater than the distance between the mobile device 101 and User A 2030. Accordingly, in general, an image of User A 2030 obtained by the camera 740 of the display device 2000 includes not only the face of User A 2030 but also environments around User A 2030. In contrast, an image of User A 2030 obtained by the mobile device 101 may include the face of User A 2030, but hardly include the entire environment around User A 2030.

In addition, the extent of image capture by the camera 740 of the display device 2000 (specifically, an angle of view 2001) may be greater than the extent of image capture by the camera 1140 of the mobile device 101 (specifically, an angle of view 2030).

As described above, when the device substitution in the video call is made, the imaging area of an image of the user A 2030, i.e., a first image, may be changed. Such a change in the imaging area is described in detail below with reference to FIG. 21.

FIG. 21 illustrates an example of an image 2110 captured by the camera 1140 of the mobile device 101 to perform a video call, and an image 2100 captured by the camera 740 of the display device 2000 to perform the video call.

Referring to the example illustrated in FIG. 21, as device substitution in the video call is made, the camera for capturing an image of User A 2030 is changed, and accordingly, an image of User A 2030 included in a video call screen may also be changed.

The display device 103, 700 or 800 according to an embodiment of the present disclosure may operate to prevent violation of the privacy of User A 2030 that may occur when User A 2030 does not recognize that his/her image included in the video call screen is changed. These operations are described in detail below with reference to FIGS. 22 to 24.

Figure 22:
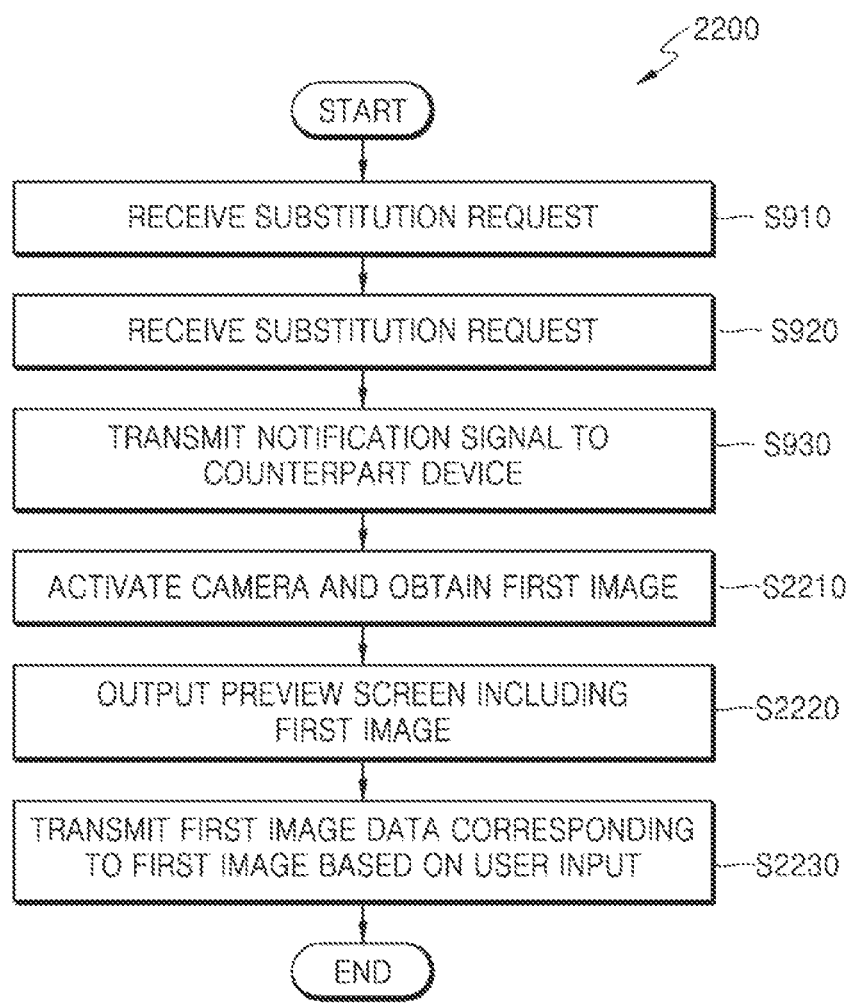
FIG. 22 is another flowchart illustrating a video call processing method according to an embodiment of the present disclosure.

FIG. 22 is another flowchart illustrating a video call processing method according to an embodiment of the present disclosure. In FIG. 22, the same operations as those of FIG. 9 are illustrated by using the same reference numerals, and thus detailed descriptions thereof are omitted. In addition, an example is described in which a video call processing method 2200 is performed by the display device 2000 described above with reference to FIG. 20.

Referring to FIG. 22, the video call processing method 2200 may further include operations S2210, S2220, and S2230, in addition to the operations of the video call processing method 900 illustrated in FIG. 9.

In, the video call processing method 2200, a first image may be obtained by activating the camera 740 included in the display device 2000, based on the substitution request received in operation S910 (S2210). Here, operations corresponding to operation S2210 may be performed by the camera 740 under control by a processor (not shown in FIG. 20) included in the display device 2000 (specifically, corresponding to the processor 710 of FIG. 8).

Accordingly, in the video call processing method 2200, first image data corresponding to the first image may be transmitted to the counterpart device of the video call (e.g., 102 of FIG. 1) (operation not shown).

In an embodiment of the present disclosure, in the video call processing method 2200, a preview screen including the first image obtained in operation S2210 may be output by the display device 2000. Here, the first image obtained in operation S2210 may correspond to the image 2100 described above with reference to FIG. 21. In detail, on the display 720 of the display device 2000, the image 2100 may be displayed as a preview screen.

In addition, in the video call processing method 2200, image data corresponding to the image 2100 provided as the preview screen may be controlled to be transmitted to the counterpart device 102 based on a user input (S2230). In addition, operations corresponding to operation S2230 may be performed by the communication unit 730 under control by the processor 710.

In detail, in operation S2230, the display device 2000 may receive a user input (hereinafter, referred to as 'permission user input') for permitting the video call screen including the image 2100 obtained as the first image to be output by the counterpart device 102. In addition, when the permission user input is received, the display device 2000 may control the first image data corresponding to the first image to be transmitted to the counterpart device 102.

Also, when the permission user input is not received, the display device 2000 may control the first image data corresponding to the image 2100 provided as the preview screen not to be transmitted to the counterpart device 102.

In addition, operation S2230 may include receiving, by the display device 2000, a user input (hereinafter, referred to as 'prohibition user input') for prohibiting the video call screen including the image 2100 from being output as it is by the counterpart device 102 (S2230). When the prohibition user input is received, the display device 2000 may control the first image data corresponding to the image 2100 provided as the preview screen not to be transmitted to the counterpart device 102.

Referring to FIG. 21, the image 2100 may be an image representing not only the face of User A but also the environment around User A. However, User A may not want the user of the counterpart device 102 (specifically, User B) to recognize the location of User A. In this case, when information about the location of User A is provided through the video call screen regardless of the intention of User A due to the device substitution in the video call, the privacy of User A may be violated.

In an embodiment of the present disclosure, in order to prevent violation of the privacy of User A due to the device substitution in the video call, as described above, the preview screen may be output to request permission from User A in advance. In an embodiment of the present disclosure, based on whether a user input is received after the preview screen is output, an image of User A included in the video call screen may be controlled. Control of an image of User A is described in detail below with reference to FIGS. 23 and 24.

Figure 23:
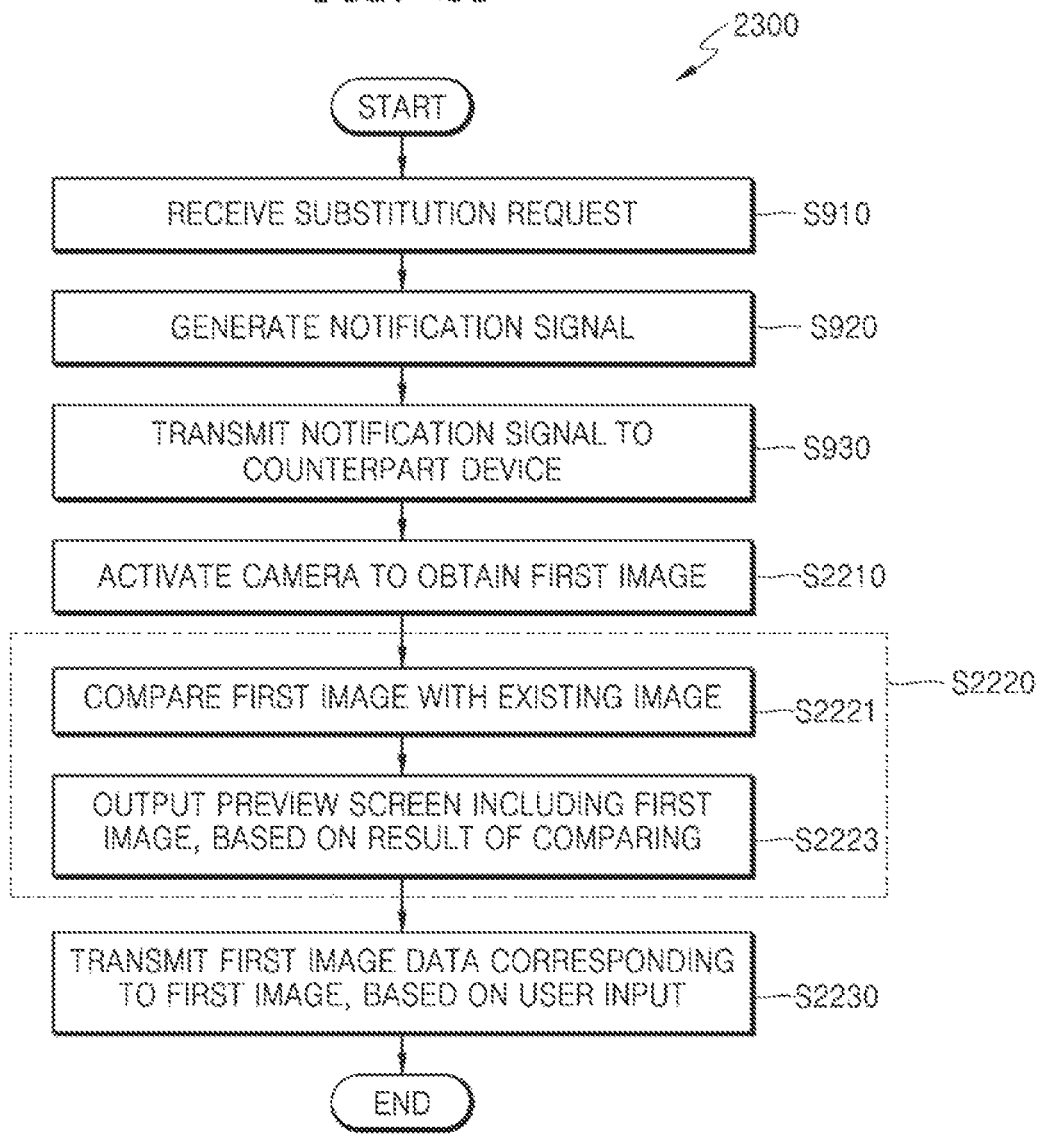
FIG. 23 is another flowchart illustrating the video call processing method of FIG. 22 in more detail.

FIG. 23 is another flowchart illustrating the video call processing method of FIG. 22 in more detail. In FIG. 23, the same operations as those of FIG. 22 are illustrated by using the same reference numerals, and thus detailed descriptions thereof are omitted. In addition, an example is described in which a video call processing method 2300 is performed by the display device 2000 described above with reference to FIG. 20.

Referring to FIG. 23, operation S2220 of FIG. 22 may include operations S2221 and S2223.

In detail, in the video call processing method 2300, the first image (e.g., the image 2100) obtained in operation S2210 may be compared with an existing image (e.g., 2110 illustrated in FIG. 20) obtained by the mobile device 101 (S2221). In detail, the processor (not shown in FIG. 20) included in the display device 2000 (specifically, corresponding to the processor 710 of FIG. 8) may compare the imaging areas of, or the amounts of information included in the first image (e.g., the image 2100) obtained in operation S2210 and the existing image obtained by the mobile device 101 (e.g., 2110 illustrated in FIG. 20) with each other.

In the video call processing method 2300, the preview screen including the first image obtained in operation S2210 may be output by the display device 2000 based on a result of the comparing in operation S2221 (S2223). Here, operation S2223 may correspond to operation S2220 of FIG. 22.

In detail, when it is determined, based on the result of the comparing in operation S2221, that the first image (e.g., the image 2100) obtained in operation S2210 includes an additional imaging area compared to the existing image (e.g., 2110 illustrated in FIG. 20) obtained by the mobile device 101, the display device 2000 may output the preview screen including the first image obtained in operation S2210.

That is, when it is determined, based on the result of the comparing in operation S2221, that the imaging area or amount of information of the first image (e.g., image 2100) obtained in operation S2210 is greater than that of the existing image (e.g., 2110 illustrated in FIG. 20) obtained by the mobile device 101, the preview screen including the first image obtained in operation S2210 may be output (S2223).

When the preview screen is output in operation S2223, the operations corresponding to operation S2230 described above with reference to FIG. 22 may be performed.

In addition, when it is determined, based on the result of the comparing in operation S2221, that the imaging area or amount of information of the first image (e.g., image 2100) obtained in operation S2210 is not greater than that of the existing image (e.g., 2110 illustrated in FIG. 20) obtained by the mobile device 101, the preview screen including the first image obtained in operation S2210 is not output. In addition, first image data regarding the first image obtained in operation S2210 may be transmitted to the counterpart device 102 as it is (S2230).

In addition, the video call processing method 2300 may include, instead of the outputting of the preview screen (S2223), when it is determined, based on the result of the comparing in operation S2221, that the first image (e.g., the image 2100) obtained in operation S2210 includes an additional imaging area compared to the existing image (e.g., 2110 illustrated in FIG. 20) obtained by the mobile device 101, outputting a notification for notifying of the result of the comparing before transmitting, from the display device 2000 to the counterpart device 102, the first image data obtained in operation S2210. Here, the notification may be output as a visual message or an audible message. For example, the display device 2000 may output a voice or a text message stating, 'The image of the camera of the TV includes a wider imaging area than that of the existing image', based on the result of the comparing in operation S2221.

Figure 24:
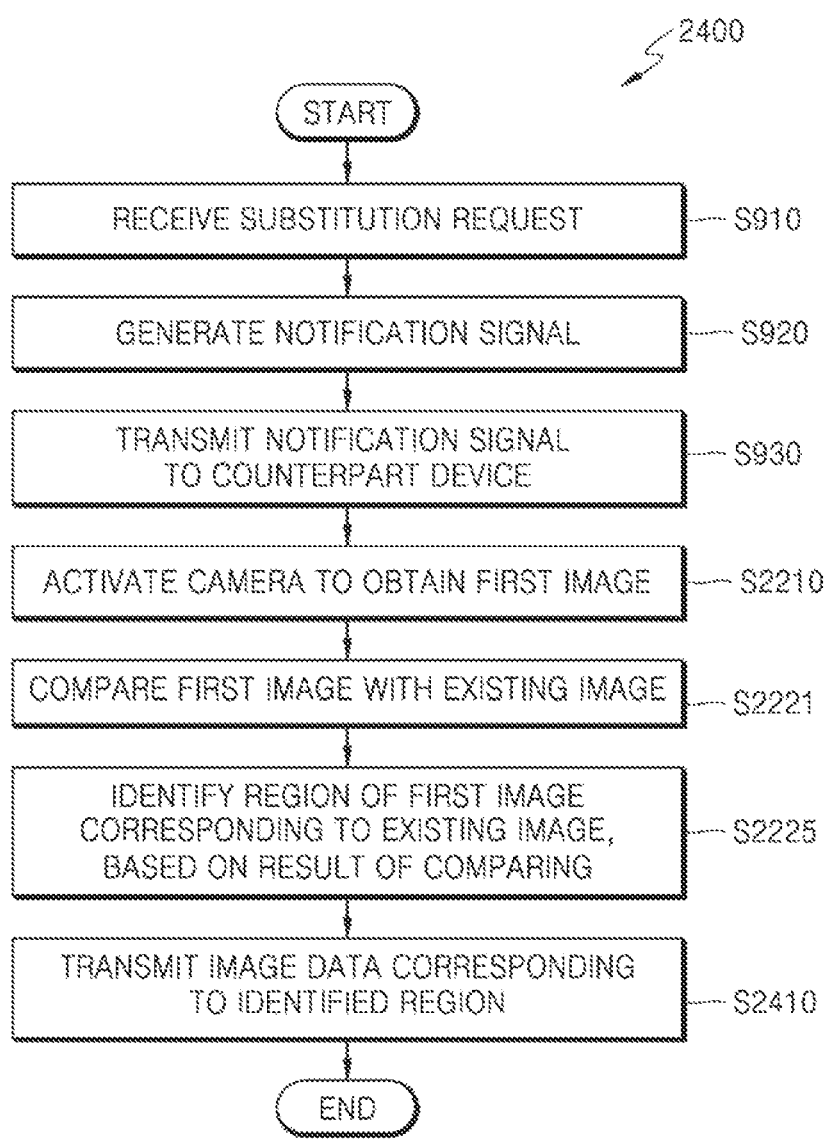
FIG. 24 is another flowchart illustrating a video call processing method according to an embodiment of the present disclosure.

FIG. 24 is another flowchart illustrating a video call processing method according to an embodiment of the present disclosure. In FIG. 24, the same operations as those of FIG. 23 are illustrated by using the same reference numerals, and thus detailed descriptions thereof are omitted. In addition, an example is described in which a video call processing method 2400 is performed by the display device 2000 described above with reference to FIG. 20.

Referring to FIG. 24, in the video call processing method 2400, subsequent to operation S2221, based on the result of the comparing of the first image obtained in operation S2210 with the existing image obtained by the mobile device 101, a region of the first image obtained in operation corresponding to the existing image may be identified (S2225). Referring back to FIG. 21, the processor (not shown in FIG. 20) included in the display device 2000 (specifically, corresponding to the processor 710 of FIG. 8) may identify a region of the first image 2100 corresponding to the existing image 2110.

In addition, in the video call processing method 2400, image data corresponding to the region identified in operation S2225 may be controlled to be transmitted from the display device 2000 to the counterpart device 102 (S2410).

In an embodiment of the present disclosure, when the video call is performed between the display device (e.g., 103 of FIG. 1) and the counterpart device 102 as device substitution is performed, the display device 103 and the counterpart device 102 may directly transmit and receive, to and from each other, data that may be required for the video call, and may communicate with each other by using at least one of the mobile device 101 and a server (e.g., the server 500 described above with reference to FIG. 5). Therefore, controlling data to be transmitted from the display device 2000 to the counterpart device 102 may be performed through the above-described direct communication, or by using communication relay through at least one of the mobile device 101 and the server (e.g., the server 500 described above with reference to FIG. 5).

Figure 25:
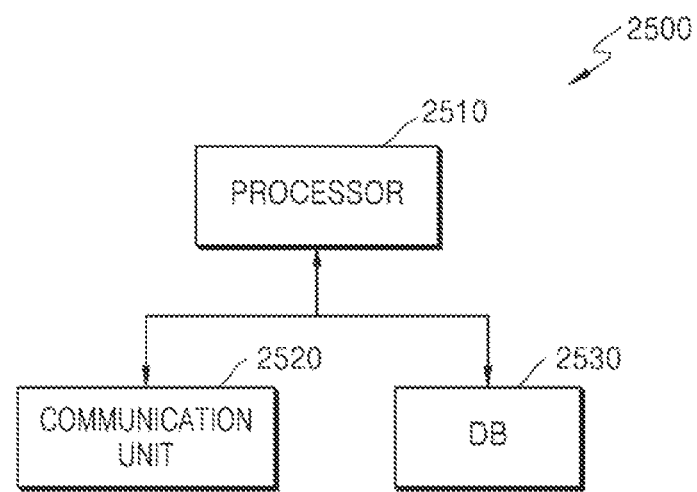
FIG. 25 is a block diagram illustrating a server according to an embodiment of the present disclosure.

FIG. 25 is a block diagram illustrating a server according to an embodiment of the present disclosure. A server 2500 illustrated in FIG. 25 corresponds to the server 500 described above with reference to FIGS. 5 and 6, and thus redundant descriptions thereof are omitted.

Referring to FIG. 25, the server 2500 may include a communication unit 2520 and a processor 2510. Also, the server 2500 may further include a database (DB) 2530.

The server 2500 may be a server that provides a video call or a video call service, or supports communication required for a video call service.

The processor 2510 controls the overall operation of the server 2500. For example, the processor 2510 may control the overall operation of the DB 2530 and the communication unit 2520, by executing at least one of at least one instruction and programs stored in the DB 2530 of the server 2500 or an internal memory (not shown) of the processor 2510.

In addition, the processor 2510 may store at least one instruction and/or a program for controlling the operation of the server 2500. In addition, the processor 2510 may control the overall operation of the DB 2530 and the communication unit 2520 by executing the at least one instruction and/or the program stored therein.

The communication unit 2520 may include one or more components for communicating with at least one external device (not shown). Here, the external device (not shown) may be at least one of at least one mobile device and a display device. Also, the external device (not shown) may be electronic devices of users requesting a video call.

In detail, the communication unit 2520 may include at least one communication module for performing communication with another device (e.g., a vehicle and/or an external server, etc.) located in a remote location, through a communication network conforming to a communication standard such as the Internet, 3G, 4G, and/or 5G.

In addition, the communication unit 2520 may include a tuner that performs broadcast reception and a communication module capable of transmitting and receiving data through a network conforming to a communication standard such as Bluetooth, WLAN (Wi-Fi), Wibro, Worldwide Interoperability for Microwave Access (WiMAX), CDMA, WCDMA, or the Internet.

In an embodiment of the present disclosure, the communication unit 2520 may communicate with at least one of a display device (e.g., 103, 700, 800, or 2000) according to an embodiment of the present disclosure, a mobile device (e.g., 101, or 1100) according to an embodiment of the present disclosure, and a counterpart device (e.g., 102 or 1100) according to an embodiment of the present disclosure, which are described above with reference to FIGS. 1 to 24, through at least one communication module supporting long-range communication, for example, a communication module conforming to a communication standard such as 3G, 4G, and/or 5G.

Hereinafter, for convenience of description, a mobile device (e.g., 101 of FIG. 1) and a counterpart device (e.g., 102 of FIG. 1) referred to in describing the server 2500 illustrated in FIG. 25 are referred to as a first mobile device and a second mobile device, respectively.

In an embodiment of the present disclosure, the processor 2510 relays a video call between the first mobile device (e.g., 101 of FIG. 1) and the second mobile device (e.g., 102 of FIG. 1), receives a substitution request that the video call being performed by the first mobile device be performed by a display device (e.g., 103 of FIG. 1), receives a notification signal generated by the display device (e.g., 103 of FIG. 1) in response to the substitution request, and controls the notification signal to be transmitted to the second mobile device (e.g., 102 of FIG. 1), before a video call screen including an image of the user of the second mobile device (e.g., 102 of FIG. 1) is output by the display device (e.g., 103 of FIG. 1).

Figure 26:
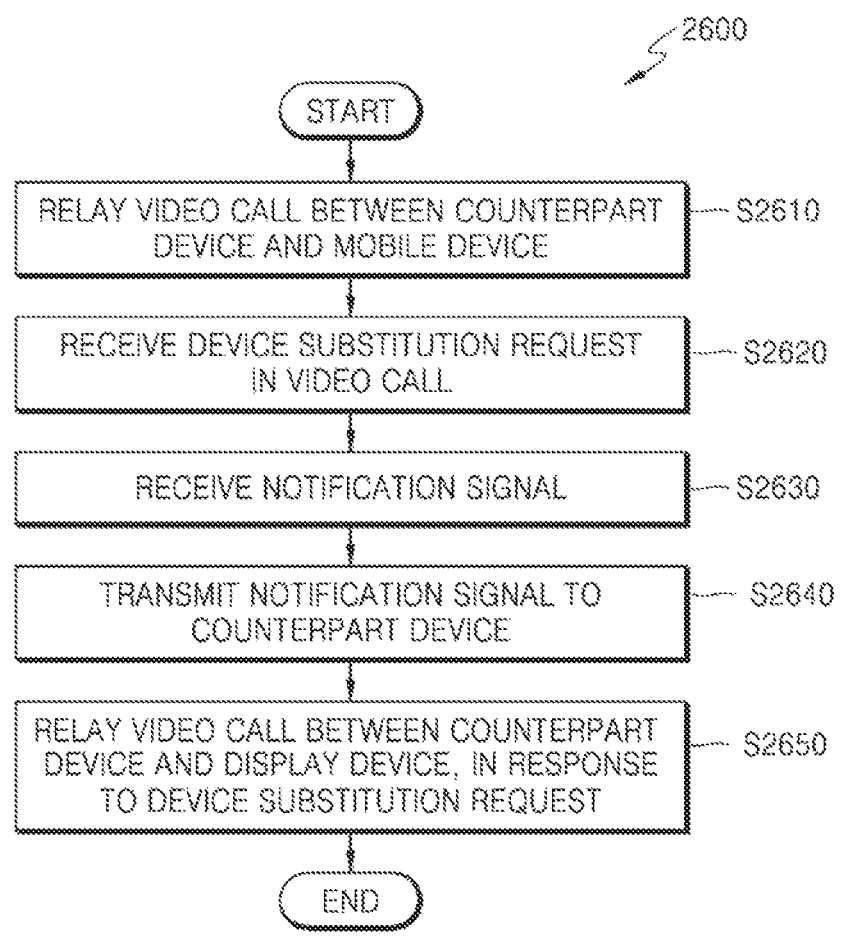
FIG. 26 is a flowchart illustrating a video call processing method performed by a server according to an embodiment of the present disclosure.

FIG. 26 is a flowchart illustrating a video call processing method performed by a server according to an embodiment of the present disclosure. In detail, a video call processing method 2600 illustrated in FIG. 26 may be performed by a server (e.g., 500 or 2500). Accordingly, FIG. 25 may be a flowchart of operations performed by the server (e.g., 500 or 2500) according to an embodiment of the present disclosure. Hereinafter, operations performed by the server 2500 are described in detail with reference to FIGS. 6, 25 and 26.

The processor 2510 of the server 2500 relays a video call between the mobile device 101 and the counterpart device 102 (S2610). In detail, operation S201 of FIG. 6 may be performed through communication relay by the server 2500. Here, operation S2610 may be performed by the communication unit 2520 under control by the processor 2510. Accordingly, the video call between the counterpart device 102 and the mobile device 101 may be started. For convenience of description, the mobile device 101 and the counterpart device 102 referred to in describing the embodiment illustrated in FIG. 26 are referred to as a first mobile device and a second mobile device, respectively.

While the video call is performed through the video call relay in operation S2610, the server 2500 receives a substitution request that the video call being performed by the first mobile device be performed by a display device (e.g., 103 of FIG. 1) (S2620). Here, operation S2610 may be performed by the communication unit 2520 under control by the processor 2510. Here, the substitution request may be transmitted from at least one of the first mobile device and the display device.

In addition, in the video call processing method 2600, a notification signal generated by the display device (e.g., 103 of FIG. 1) in response to the substitution request (S2630). Here, operation S2630 may be performed by the communication unit 2520 under control by the processor 2510. The notification signal may be directly transmitted from the display device. Alternatively, the notification signal may be generated by the display device and then transmitted through the first mobile device.

Then, in the video call processing method 2600, the notification signal is controlled to be transmitted to the second mobile device (e.g., 102 of FIG. 1) before a video call screen including an image of a user of the second mobile device (e.g., 102 of FIG. 1) is output by the display device (e.g., 103 of FIG. 1) (S2640). Here, operation S2640 may be performed by the communication unit 2520 under control by the processor 2510.

In addition, in the video call processing method 2600, a video call between the second mobile device 102, which is the counterpart device, and the display device 103 may be then relayed (S2650). Here, operation S2650 corresponds to operation S270 described above with reference to FIGS. 3 and 6, and thus detailed descriptions thereof are omitted.

A video call processing method according to an embodiment of the present disclosure may be embodied as program instructions executable by various computer devices, and then recorded on a computer-readable medium. In addition, an embodiment of the present disclosure may be implemented in a computer-readable recording medium having recorded thereon one or more programs including instructions for executing the video call processing method.

The computer-readable medium may include program instructions, data files, data structures, or the like separately or in combinations. The program instructions to be recorded on the medium may be specially designed and configured for the present disclosure or may be well-known to and be usable by one of ordinary skill in the art of computer software. Examples of the computer-readable recording medium include magnetic media such as hard disks, floppy disks, or magnetic tapes, optical media such as compact disc ROMs (CD-ROMs) or digital video discs (DVDs), magneto-optical media such as floptical disks, and hardware devices such as ROM, RAM, and flash memory, which are specially configured to store and execute program instructions. Examples of the program instructions include not only machine code, such as code made by a compiler, but also high-level language code that is executable by a computer by using an interpreter or the like.

Here, the machine-readable storage medium may be provided in the form of a non-transitory storage medium. Here, the term 'non-transitory' merely means that the storage medium does not refer to a transitory electrical signal but is tangible, and does not distinguish whether data is stored semi-permanently or temporarily on the storage medium. For example, the non-transitory storage medium may include a buffer in which data is temporarily stored.

According to an embodiment, the video call processing method according to an embodiment of the present disclosure may be included in a computer program product and then provided. The computer program product may be traded between a seller and a purchaser as a commodity. The computer program product may be distributed in the form of a machine-readable storage medium (e.g., a CD-ROM), or may be distributed online (e.g., downloaded or uploaded) through an application store (e.g., Play Store™) or directly between two user devices (e.g., smart phones). In the case of online distribution, at least a portion of the computer program product (e.g., a downloadable app) may be temporarily stored in a machine-readable storage medium such as a manufacturer's server, an application store's server, or a memory of a relay server.

In detail, the video call processing method according to an embodiment of the present disclosure may be implemented as a computer program product including a recording medium having stored therein a program for performing receiving a substitution request that a video call being performed by a mobile device be performed by the display device, generating, by the display device in response to the substitution request, a notification signal corresponding to the substitution request; and transmitting, before a video call screen including an image of a counterpart of the video call is output by the display device, the notification signal to a counterpart device, which is a mobile device of the counterpart.

Although embodiments have been described above in detail, the scope of the present disclosure is not limited thereto, and various modifications and alterations by one of ordinary skill in the art using the basic concept of the present disclosure defined in the following claims also fall within the scope of the present disclosure.

What is claimed is:

1. A video call processing method performed by a display device, the video call processing method comprising:
   receiving a substitution request that a video call being performed by a mobile device be performed by the display device;
   generating, by the display device based on the substitution request, a notification signal corresponding to the substitution request, the notification signal comprising at least one of information about a product model of the display device, a product type of the display device, or a display size of the display device;
   transmitting, before a video call screen that includes an image of a counterpart of the video call is output by the display device, the notification signal to a counterpart device, which is a mobile device of the counterpart; and
   receiving a selection at the counterpart device to select whether to continue transmitting images of a user of the counterpart device to the display device.

2. The video call processing method of claim 1, wherein the notification signal further comprises information indicating that the display device is configured to be viewed by multiple users.

3. The video call processing method of claim 1, further comprising performing, based on an offset period of time elapsing after the notification signal is transmitted, the video call by the display device.

4. The video call processing method of claim 1, further comprising performing, based on a response for accepting the substitution request being received from the counterpart device, the video call by the display device.

5. The video call processing method of claim 1, further comprising activating, based on the substitution request, a camera included in the display device and outputting a video call screen that includes a first image obtained by the camera.

6. The video call processing method of claim 5, wherein the outputting of the video call screen comprises outputting, based on a response corresponding to the notification signal being received from the counterpart device, the video call screen that includes the first image and a second image of the counterpart obtained by the counterpart device.

7. The video call processing method of claim 5, wherein the outputting of the video call screen comprises outputting, based on the response corresponding to the notification signal not being received from the counterpart device, the video call screen that includes the first image and an alternative image, which is not an image of the counterpart of the video call.

8. The video call processing method of claim 1, further comprising:

activating, based on the substitution request, a camera included in the display device and obtaining a first image; and
transmitting, to the counterpart device of the video call, first image data corresponding to the first image.

9. The video call processing method of claim 8, wherein the transmitting to the counterpart device comprises:
   outputting, by the display device, a preview screen that includes the first image;
   receiving a user input for permitting a video call screen that includes the first image to be output by the counterpart device; and
   based on the user input being received, transmitting, to the counterpart device, first image data corresponding to the first image.

10. The video call processing method of claim 8, wherein the transmitting to the counterpart device comprises:
    comparing the first image with an existing image obtained by the mobile device; and
    based on a result of the comparing, outputting, by the display device, a preview screen that includes the first image.

11. The video call processing method of claim 10, wherein the outputting of the preview screen comprises, based on determining that the first image includes an additional imaging area compared to the existing image, outputting, by the display device, a preview screen that includes the first image.

12. The video call processing method of claim 10, wherein the outputting of the preview screen comprises, based on determining that the first image includes an additional imaging area compared to the existing image, outputting, before transmitting the first image data from the display device to the counterpart device of the video call, a notification for notifying of the result of the comparing.

13. The video call processing method of claim 1, further comprising:
    activating, based on the substitution request, a camera included in the display device and obtaining a first image;
    based on a result of comparing the first image with the existing image obtained by the mobile device, identifying a region of the first image corresponding to the existing image; and
    controlling image data corresponding to the identified region to be transmitted to the counterpart device.

14. A display device comprising:
    a display;
    a camera;
    a communication interface configured to communicate with a mobile device; and
    a processor configured to execute at least one instruction to:
       receive a substitution request that a video call being performed by the mobile device be performed by the display device;
       generate, based on the substitution request, a notification signal corresponding to the substitution request, the notification signal comprising at least one of information about a product model of the display device, a product type of the display device, or a display size of the display device;
       control the notification signal to be transmitted to a counterpart device of the video call before a video call screen that includes an image of a counterpart of the video call is output on the display; and receive a selection at the counterpart device to select whether to continue transmitting images of a user of the counterpart device to the display device.

15. A non-transitory computer-readable storage medium having recorded thereon a program including at least one instruction for performing a video call processing method, the video call processing method comprising:
- receiving a substitution request that a video call being performed by a mobile device be performed by a display device;
- generating, by the display device based on the substitution request, a notification signal corresponding to the substitution request, the notification signal comprising at least one of information about a product model of the display device, a product type of the display device, or a display size of the display device;
- transmitting, before a video call screen that includes an image of a counterpart of the video call is output by the display device, the notification signal to a counterpart device of the video call; and
- receiving a selection at the counterpart device to select whether to continue transmitting images of a user of the counterpart device to the display device.

* * * * *